(12) United States Patent
Ohkawa et al.

(10) Patent No.: US 6,631,844 B1
(45) Date of Patent: Oct. 14, 2003

(54) OPTICAL SCANNER, CODE READER AND BAR CODE READER HAVING INCREASED DEGREE OF FREEDOM IN PLACEMENT OF OPTICAL PARTS

(75) Inventors: Masanori Ohkawa, Kawasaki (JP); Toshiyuki Ichikawa, Atsugi (JP); Hiroshi Watanuki, Machida (JP); Kozo Yamazaki, Hatano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/422,268

(22) Filed: Oct. 21, 1999

(30) Foreign Application Priority Data

Oct. 21, 1998 (JP) .......................................... 10-299621

(51) Int. Cl.[7] ................................................. G06K 7/10
(52) U.S. Cl. .............................. 235/462.38; 235/462.4
(58) Field of Search ...................... 235/462.21, 462.01, 235/462.4, 462.36, 462.38, 454, 462.39, 462.37

(56) References Cited

U.S. PATENT DOCUMENTS

| | | |
|---|---|---|
| 3,225,177 A | 12/1965 | Stites et al. |
| 3,622,758 A | 11/1971 | Schanne |
| 3,728,677 A | 4/1973 | Munson |
| 3,812,325 A | 5/1974 | Schmidt |
| 3,818,444 A | 6/1974 | Connell |
| 3,916,158 A | 10/1975 | Sansone et al. |
| 3,947,816 A | 3/1976 | Rabedeau |
| 3,958,104 A | 5/1976 | Zuckerman |
| 4,093,865 A | 6/1978 | Nickl |
| 4,224,509 A | 9/1980 | Cheng |
| 4,587,407 A | 5/1986 | Ahmed et al. |
| 4,652,732 A | 3/1987 | Nicki |
| 4,681,394 A | 7/1987 | Noguchi |
| 4,795,224 A | 1/1989 | Goto |
| 4,935,609 A | 6/1990 | Wike, Jr. |
| 4,971,410 A | 11/1990 | Wike, Jr. |
| 4,982,205 A | 1/1991 | Hasegawa |
| 5,000,529 A | 3/1991 | Katoh et al. |

(List continued on next page.)

FOREIGN PATENT DOCUMENTS

| | | | |
|---|---|---|---|
| DE | 2757235 | 7/1979 | |
| DE | 3609669 | 10/1986 | |
| DE | 195 45 137 | 6/1997 | |
| EP | 0040973 | 12/1981 | |
| EP | 0 273 554 | 7/1988 | |
| EP | 0 772 147 | 5/1997 | |
| EP | 0 779 591 | 6/1997 | |
| EP | 0 811 958 | 12/1997 | |
| JP | 60-238811 | 11/1985 | |
| JP | 61-233876 | 10/1986 | |
| JP | 61-238811 | 10/1986 | |
| JP | 1-228075 | 9/1989 | |
| JP | 2-053194 | 2/1990 | |
| NL | 7713933 | 6/1979 | |
| WO | 94/01835 | * 1/1994 | .......... G06K/15/00 |

*Primary Examiner*—Daniel St. Cyr
(74) *Attorney, Agent, or Firm*—Staas & Halsey LLP

(57) ABSTRACT

A multi-head optical scanning device used for a bar code reader having a reduced thickness and realizing more complete 360° bar code reading. The scanning device includes a bottom part, a side part which is nearly vertical to the bottom part, a light source, a polygon mirror and a light detector contained inside the body of the side part. Light beams are emitted from the light source so that they are nearly vertical to the surface of the bottom part, and the polygon mirror has a rotation axis at a position which is nearly parallel to the surface of the bottom part. The optical scanning device eliminates the need for a mechanism which performs scanning inside the bottom part and the degree of freedom with which each of the pattern mirrors is disposed is increased, and provides a scanning pattern whose reading capacity can be upgraded by using a scanning pattern which is emitted from the bottom part.

22 Claims, 22 Drawing Sheets

U.S. PATENT DOCUMENTS

| | | | |
|---|---|---|---|
| 5,019,694 A | | 5/1991 | Collins, Jr. |
| 5,028,103 A | | 7/1991 | Fukasawa |
| 5,042,619 A | | 8/1991 | Kohno |
| 5,073,702 A | | 12/1991 | Schuhmacher |
| 5,128,520 A | * | 7/1992 | Rando et al. ............... 235/375 |
| 5,206,491 A | | 4/1993 | Katoh |
| 5,229,588 A | | 7/1993 | Detwiler et al. |
| 5,268,565 A | | 12/1993 | Katoh et al. |
| 5,293,033 A | * | 3/1994 | Yamashita ................ 235/462 |
| 5,459,308 A | | 10/1995 | Detwiler et al. |
| 5,475,207 A | * | 12/1995 | Bobba et al. ............... 235/467 |
| 5,491,328 A | | 2/1996 | Rando |
| 5,684,289 A | | 11/1997 | Detwiler et al. |
| 5,693,930 A | | 12/1997 | Katoh et al. |
| 5,705,802 A | | 1/1998 | Bobba et al. |
| 5,801,370 A | * | 9/1998 | Katoh et al. ............... 235/467 |
| 5,825,010 A | | 10/1998 | Charych et al. |
| 5,834,708 A | * | 11/1998 | Svetal et al. ............... 177/180 |
| 5,869,827 A | * | 2/1999 | Rando .................... 235/462.4 |
| 5,886,336 A | * | 3/1999 | Tang et al. ................ 235/462 |
| 5,936,218 A | | 8/1999 | Ohkawa et al. |
| 5,975,417 A | * | 11/1999 | Spenser et al. ........ 235/462.36 |
| 6,076,735 A | * | 6/2000 | Saegusa .................. 235/462.4 |

* cited by examiner

OPTICAL SCANNER, CODE READER AND BAR CODE READER HAVING INCREASED DEGREE OF FREEDOM IN PLACEMENT OF OPTICAL PARTS

CROSS-REFERENCE TO RELATED APPLICATIONS

This application is based upon and claims priority of Japanese Patent Application No. 10-299,621 filed Oct. 21, 1998, the contents being incorporated herein by reference.

BACKGROUND OF THE INVENTION

1. Field of the Invention

The present invention relates to an optical scanner which is used for bar code readers and the like. More particularly, the present invention relates to a multi-head optical scanner used for a bar code reader and having placement of optical parts to reduce size and improve code reading.

2. Description of the Related Art

Point-of-sale (POS) and other systems are widely used to perform checkout counter operations by reading bar code information attached to products. In operation of the conventional type of POS system, bar code information is input by scanning the product and checkout operations are performed based on the information input in this manner, thus reducing the workload for the operator at the checkout counter. So-called stationary type scanners which are fixed to the checkout counter are most often used in POS systems.

The conventional devices typically include a simple reading window and emit an outgoing generally either the type placed horizontally on the surface of the counter or the type placed vertically on the surface of the counter. However, in operation of the conventional types of devices, the direction at which the bar code can be read (i.e., the bar code orientation) is restricted so that the operator has to point the bar code in the direction of the reading window, thus adding to the workload of the operator.

So-called multi-head scanners have been proposed to reduce the burden of the checkout counter operator and have come into widespread use. The known multi-head scanners include a window which is horizontal to the surface of the counter (bottom window) and a window which stands vertically to the surface of the counter (side window).

However, the multi-head scanners proposed thus far have presented the following problems. Firstly, the thickness of a bottom part of the conventional multi-head scanner device has been problematical. In Europe, it has been mandated by law that the checkout counter operators performing checkout operations be seated while working. The scanners are embedded in the surface of the counter so that when the scanner is thick, it is possible that the scanner will stick out from the bottom surface of the counter. In the case that the scanner sticks out from the bottom surface of the counter, the operator is faced with an increased workload because it is no longer possible for him to place his knees below the surface of the counter, and the operability of the bar code reading operation is deteriorated since the height of the scanning surface is increased. However, when the checkout counter operator carries out the bar code reading operations in a standing position, the difficulties discussed above do not occur.

Furthermore, the checkout counter often has a drawer holding cash positioned below the scanner. When a drawer holding cash is positioned below the scanner, problems occur in that when the scanner is thick, the distance between the operator and the cash drawer increases, and it is awkward for the operator to put cash into the drawer and remove cash from the drawer adroitly.

To overcome the above-described problems, end-users have demanded a scanner which has a thickness of 90 mm and under. However, conventional multi-head scanners are all 100 mm and thicker, which does not satisfy end-user needs. When the devices are actually used, this difference in thickness of approximately 10 mm is quite significant.

Secondly, problems occur because the conventional multi-head scanner cannot handle total 360° reading. The greatest characteristic of multi-head scanners is that they can read a bar code regardless of the direction in which the bar code is pointed. In particular, since the multi-head scanner has an outgoing scanning pattern for the bottom part and the side part, respectively, the scanner can read the bar code information even if the bar code is not pointed in the direction of the reading window.

However, the conventional multi-head scanner results in problems in that it is no longer possible to read the bar code because of the incline between the bar code and the counter surface and total 360° reading is not possible. For example, there are cases in which reading of the bar code can be carried out when the bar code is parallel to the counter surface, but not when the bar code is placed vertically to the counter surface. In these cases, it is impossible to carry out 360° reading.

Thirdly, problems occur with the conventional multi-head scanner because there are cases in which it is impossible to provide a multi-scanning pattern by using a single light beam. The multi-scanning light pattern referred to here is the general name for the scanning pattern outgoing from the bottom part and the scanning pattern outgoing from the side part.

The conventional multi-head scanners include multiple light sources which provide incident light beams from the respective light sources to a scanning means of a polygon mirror and the like. The light beams outgoing from a single light source are split by a beam splitter, and the respective light sources are incident from different directions to the scanning means. When the number of light beams incident to the scanning means is increased in the above manner, it is necessary to provide as many light detection devices to receive reflective light from the bar code, and as many converging means to provide incident reflected light to the light detection devices as there are light beams. Thus, problems arise in that the size and cost of the M) scanner are increased.

SUMMARY OF THE INVENTION

It is an object of the present invention to overcome the above-described problems of the prior art, and to provide an optical scanner which reduces the thickness of a bottom part of the optical scanner.

It is another object of the present invention to provide an optical scanner having a bottom part with a thickness of 90 mm and below.

It is another object of the present invention to provide a multi-head optical scanner and other types of optical scanners which can ensure virtually perfect 360° reading.

It is yet another object of the present invention to provide an optical scanner which uses a single light beam incident on the scanning device and which can generate multi-scanning patterns.

Objects and advantages of the present invention are achieved in accordance with embodiments of the present invention with an optical scanner which emits a first scanning pattern upward from a horizontal plane surface and emits a second scanning pattern to a side from a plane surface which is vertical relation to the horizontal plane surface, the optical scanner comprising: a light source to emit light beams; a scanning device to scan the light beams emitted from the light source, the scanning device including a rotation axis; and a drive device to drive the scanning device, wherein the scanning device is positioned so that the rotation axis of the scanning device is approximately horizontal to the horizontal plane surface.

In accordance with embodiments of the present invention, the surface from which the second scanning pattern is emitted does not have to be vertical to the horizontal plane, and the angle formed by the horizontal plane and the surface which is vertical to the horizontal plane need not be a 90° angle. The angle formed by the surface from which the second scanning pattern is emitted and the horizontal plane may be other than a 90° angle.

In accordance with embodiments of the present invention, the light source may be positioned so that light beams are emitted in a direction which is nearly vertical relative to the horizontal plane.

Objects and advantages of the present invention are achieved in accordance with embodiments of the present invention with a code reader comprising a bottom part embedded in a surface of a counter and emitting a first scanning pattern to read a code optically; a side part, positioned vertically to the bottom part, and emitting a second scanning pattern different from the first scanning pattern to read the code optically; and a speaker positioned facing a user at a top center of the side part to emit a sound indicating to the user that the code has been read.

Objects and advantages of the present invention are achieved in accordance with embodiments of the present invention with a code reader comprising a bottom part embedded in a surface of a counter to emit a first scanning pattern to optically read a code; a side part, positioned vertically to the bottom part, to emit a second scanning pattern different from the first scanning pattern to optically read the code; and a light receiving device mounted on a substrate to receive light reflected from the code, wherein the substrate is positioned in a direction skirting the orientation of a back wall surface of the side part.

In accordance with embodiments of the present invention, the light receiving device may include a light-receiving surface which faces downward.

Objects and advantages of the present invention are achieved in accordance with embodiments of the present invention with an optical scanner comprising a light source to emit light beams; a scanning device to scan the light beams emitted from the light source; a scanning pattern mirror to reflect scanned light generated by the scanning device, the scanning pattern mirror including a plurality of mirrors to generate scanning beams which make up the scanning patterns; and an opening from which the scanning beams are emitted, wherein the scanning beams are emitted from the opening after being reflected by the plurality of mirrors.

Objects and advantages of the present invention are achieved in accordance with embodiments of the present invention with an optical scanner comprising a light source to emit light beams; a scanning device to scan light beams emitted from the light source; a scanning pattern mirror to reflect scanned light generated by the scanning device, the scanning pattern mirror including a plurality of mirrors to generate scanning patterns comprising scanning beams; and an opening from which the scanning beams are emitted, wherein a first scanning light is scanned in a first direction on at least one of the plurality of mirrors which make up the scanning pattern mirrors; and a second scanning light is scanned in a second direction intersecting the first direction on at least one of the plurality of mirrors which make up the scanning pattern mirror.

Objects and advantages of the present invention are achieved in accordance with another embodiment of the present invention with an optical scanner comprising a light source to emit light beams; a scanning device to scan the light beams emitted from the light source; a pattern mirror including a plurality of mirrors to reflect scanning light generated by the scanning device; and an opening through which the scanning light reflected by the pattern mirror is passed, wherein a first scanning light is scanned in a first direction on a first virtual surface outside the opening, and a second scanning light is scanned in a direction nearly forming a right angle with the first direction on the virtual surface, and both the first and second scanning lights are emitted from the opening after being reflected jointly by at least two common mirrors of the mirrors which make up the pattern mirror.

Objects and advantages of the present invention are achieved in accordance with embodiments of the present invention with a bar code reader positioned on top of a counter, the bar code reader comprising a bottom part body having a first surface which is horizontal to a surface of the counter; and a side part body having a second surface positioned at approximately a right angle to the first surface, wherein a thickness of a portion of the bottom part body which is positioned underneath the counter is 90 mm or less.

Objects and advantages of the present invention are achieved in accordance with embodiments of the present invention with a bar code reader located on top of a counter, comprising a bottom part body having a first surface which is horizontal to a surface of the counter; a side part body having a second surface which forms approximately a right angle to the first surface; a light source to emit light beams; a scanning device to scan light emitted from the light source; a light receiving device to receive reflected light from the bar code; and a converging device to converge reflected light from the bar code to the light receiving device, wherein the light source and the scanning device are located inside the side part body.

In accordance with embodiments of the present invention, scanning device may be placed at a position which is higher than the surface of the counter on which the bar code reader is placed.

Objects and advantages of the present invention are achieved with an optical scanner which emits a first scanning pattern upward from a horizontal plane and a second scanning pattern sideways vertical to the horizontal plane, comprising a light source to emit light beams; a scanning device having a reflecting surface to reflect light beams emitted from the light source; and a drive device to drive the scanning device, wherein the scanning device is positioned so that light beams are reflected downward.

Objects and advantages of the present invention are achieved with an optical scanner, comprising a bottom part which is embedded in the surface of a counter; and a side part positioned vertically to the bottom part, wherein different scanning patterns are respectively emitted from the bottom part and the side part.

In accordance with embodiments of the present invention, the optical scanner may include a scanning device having a reflective surface wherein the reflective surface of the scanning device reflects the light beams downward.

Objects and advantages of the present invention are achieved with a code reader which reads code after emitting scanning light and detecting the light reflected from objects, comprising a first scanning light which is scanned in a first direction; and a second scanning light which is scanned in a direction intersecting with the first scanning light, both scanning lights passing through the same optical path.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figures 1, 2:
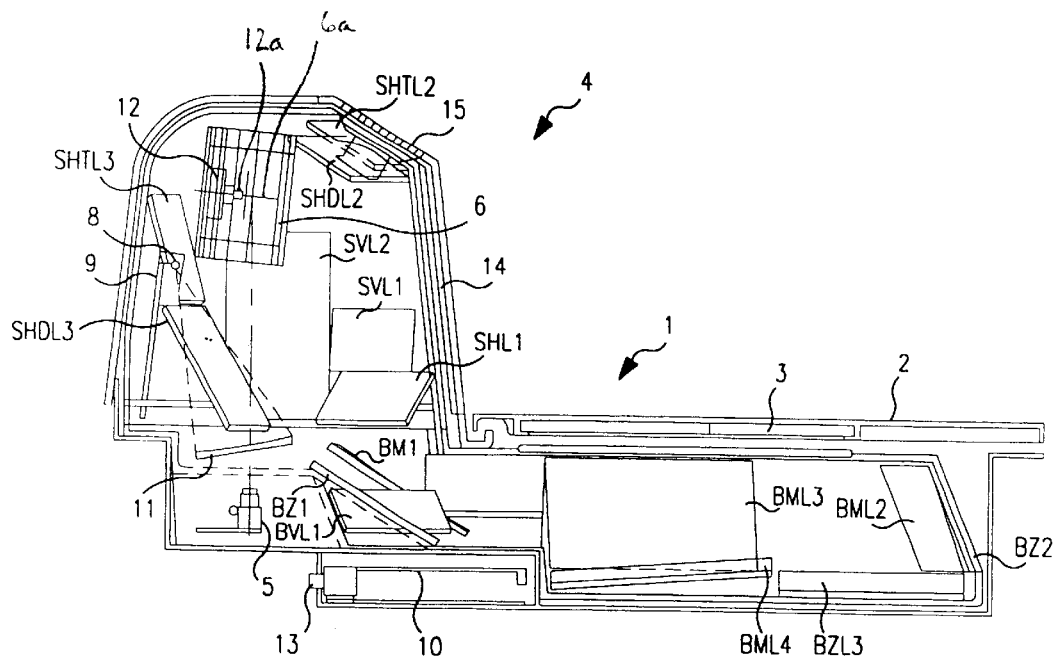
FIG. 1 is an internal side view of a bar code reader in accordance with a first embodiment of the present invention.
FIG. 2 is an internal upper view of the bar code reader in accordance with the first embodiment of the present invention.

Reference will now be made in detail to the preferred embodiments of the present invention, examples of which are illustrated in the accompanying drawings, wherein like reference numerals refer to like elements throughout.

The bar code reader (hereinafter referred to simply as "device") described hereinbelow in accordance with embodiments of the present invention is preferably a so-called multi-head scanner which is embedded in a checkout counter. Further, the outside structure of the device may take the form of any of the many types of multi-head scanners currently in use. Accordingly, no drawing of the outside of the device is provided.

As shown in FIG. 1, the device includes a bottom window 3 placed at a position which is parallel to a surface (product scanning surface) of the checkout counter 2 and a side window 14 placed so that it preferably forms a right angle to the surface of the checkout counter 2. A scanning pattern, which is made up of a plurality of scanning beams, is emitted from these respective windows 3, 14 to read the bar code. The entire portion of the bar code reader on which the bottom window 3 is placed is referred to hereinafter as the "bottom part" 1; the entire to portion of the bar code reader on which the side window 14 is placed is referred to hereinafter as the "side part" 4.

A surface of the device to which the bottom window 3 is fixed is positioned so that it is level with the checkout counter 2 surface so that a product can be slid on the checkout counter 2 and the bar code read. The side window 14 is also disposed to face the operator carrying out the bar code reading operations.

Figure 3A:
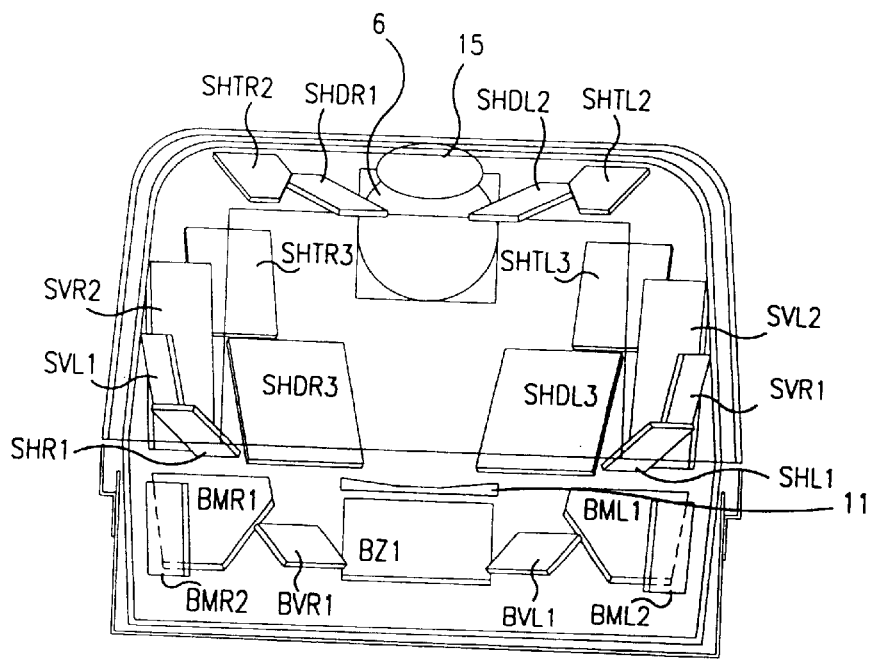
FIG. 3 is internal frontal view of the bar code reader in accordance with the first embodiment of the present invention.
Figure 3B:
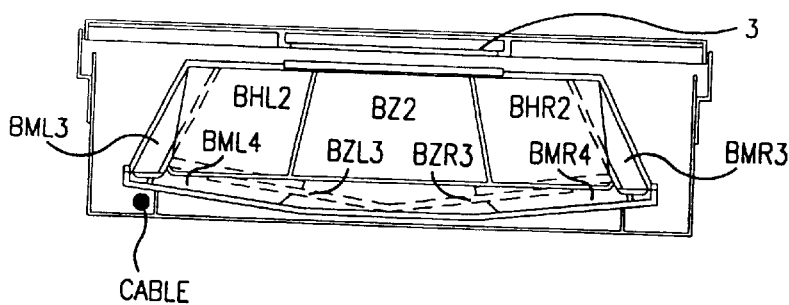

FIGS. 1–3 are diagrams providing an internal view of the device in accordance with the first embodiment of the present invention. More particularly, FIG. 1 is an internal side view, FIG. 2 is an internal upper view, and FIG. 3 is an internal frontal view of the bar code reading device in accordance with the first embodiment of the present invention. FIG. 3A is a frontal cross-sectional view taken near an extended line of the side window 14. FIG. 3B is a frontal cross-sectional view of the front end of the device.

As shown in FIGS. 1–3, the device comprises a bottom part 1 positioned generally underneath the surface of the counter 2, and a side part 4 which is vertical or approximately vertical to the surface of the counter 2. The bottom part 1 includes in a surface thereof a bottom window 3 which is level with the surface of the counter 2. The bottom window 3 is level with the surface of the counter 2 to accommodate instances in which a product is slid on the surface of the counter 2 to read the bar code. When there is a space between the surface of the counter 2 and the surface of the bottom part 1, a product may become caught in this space, thereby adversely affecting the operability of the reading process and damaging the product in some instances. Since the product may be slid across the surface of the counter 2 in the above described manner, the counter 2 surface is also known as the "product sliding surface." Further, in accordance with the embodiment of the invention shown in FIG. 1, the bottom part 1 is preferably relatively long, and the side part 4 is preferably relatively short.

As shown in FIG. 1, the device includes a light source 5, such as a laser diode, which emits laser beams; a polygon mirror 6, which is an example of a scanning device, to scan the laser beams emitted from the light source 5; a pattern mirror comprising several mirrors, which will be described in greater detail hereinbelow, to generate scanning beams which make up the scanning pattern by suitably reflecting the light beams scanned by the polygon mirror 6; a light detector 8 which receives light, reflected from the bar code and outputs electrical signals according to the quantity of light received; an analog-to-digital conversion circuit 9 (hereinafter referred to as "A/D circuit", or simply "substrate") which binomializes the signals (analog signals) output from the light detector 8; and a main printed substrate 10 (main PCB) including a decoder to demodulate the bar code based on the digital signals output from the A/D circuit 9. The reflected light which is incident on the light detector 8 is converged and reflected from a concave mirror 11.

In the embodiment of the invention shown in FIG. 1, laser diodes are used as the light source 5. The light source 5 is preferably a laser light source unit including a collimator (not shown) and an aperture (not shown), which are laser beam reshaping means, to reshape the laser beams emitted from the laser diode and a driver circuit (not shown) to drive the laser light source 5. The laser beam reshaping means and the driver circuit preferably form an integral piece.

The light source 5 is positioned at the lower left-hand part of the device shown in FIG. 1, that is, the lower portion of the body of the side part 4. Laser beams are emitted upward from the light source 5 in the lower part of the device. In accordance with the first embodiment of the present invention, as shown in FIG. 1, the laser light is emitted from the light source 5 nearly vertically upwards. However, the direction in which the laser light is emitted from the light source 5 (i.e., the outgoing angle) may have various inclines depending on the design of the device and other conditions.

Prior art multi-head scanners, which are placed on the checkout counter in the same manner as described above in accordance with the first embodiment of the invention, do not have a configuration in which light beams are emitted upward without splitting the light beams.

The laser light emitted from the light source 5 is incident on the polygon mirror 6. In accordance with the first embodiment of the present invention, the polygon mirror 6 is placed near the center of the body of the side part 4. Although not specifically shown in the figures, the polygon mirror 6 in accordance with the first embodiment of the invention preferably includes four reflective surfaces each having slightly different slopes. Since the respective slopes of each of the four reflective surfaces are different, the polygon mirror 6 can generate four parallel scanning lights.

The polygon mirror 6 is driven to rotate by a motor 12 to scan the incident laser light. The motor 12 includes a rotation shaft 12a. A base portion of the polygon mirror 6 is made of molded resin with a hole formed therein. The rotation shaft 12a of the motor 12 is inserted into the hole in the base portion of the polygon mirror 6. The polygon mirror 6 has a rotation axis 6a positioned so that it is nearly parallel with the bottom window 3, which is essentially the same as the surface on which the product is slid. In accordance with the first embodiment of the present invention, the rotation axis 6a is preferably at an angle of approximately 5° with respect to the horizontal, with the side of the rotation axis 6a nearer to the bottom window 3 facing downwards. However, the slope of the rotation axis 6a of the polygon mirror 6 can be varied as is suitable according to the design.

Thus, the polygon mirror 6 in accordance with the first embodiment of the present invention is configured so that the laser light is incident on the polygon mirror 6 upward from the bottom of the device and the scanning light is reflected and outgoing downward from the polygon mirror 6. As a result, the reflective surface of the polygon mirror 6 can be thought of as being directed downward. Although there are also reflective surfaces which are directed upward, these surfaces are not used to reflect incident laser light because a laser light beam cannot be emitted to all of the reflective surfaces at once. If one takes into consideration only reflective surfaces which operate effectively, the reflective surface may be thought of as directed downward. Further, it is noted that a vibrating mirror may be used to reflect the laser light instead of a polygon mirror.

The first embodiment of the present invention differs from and is advantageous over the prior art multi-head scanner in at least the following points. In prior art multi-head scanners, the rotation axis of a polygon mirror is placed so that it is nearly vertical to the bottom window. Further, the prior art polygon mirror is basically placed inside the body of the bottom part or below the body of the side part. Therefore, there is a limit as to how freely the optical parts can be disposed inside the bottom part of the prior art optical scanners. Furthermore, in prior art multi-head scanners, it is particularly difficult to increase the size of the pattern mirror in the bottom part either because of the positioning of the polygon mirror and the light source because of the optical path of the laser light.

In accordance with the first embodiment of the present invention, the light source 5 and scanning device are positioned such that neither the light source 5 nor the scanning device is disposed inside the body of the bottom part 1. As a result of this arrangement, there is greater facility in disposing the other optical parts, specifically, the pattern mirror, inside the body of the bottom part 1.

The light reflected from the bar code is divergent light. The quantity of reflected light which is received from the bar code should, insofar as possible, be increased in order to upgrade the reading performance of the bar code. The pattern mirror functions to send incident reflected light from the bar code to the light detector 8. As a result, the pattern mirror should be made as large as possible. The device in accordance with the first embodiment of the present invention satisfies these needs.

As can be seen in FIG. 1, the light detector 8 is attached to the substrate on which the A/D circuit 9 is mounted so that the light detector 8 forms an integral piece with the substrate 9. The substrate 9 is attached near the back of the body of the side part 4 at a position which is nearly parallel to the surface of the wall of the side part 4. As shown in FIG. 1, the light receiving surface of the light detector 8 is directed downward. Light converged from the concave mirror 11 is incident on the light-receiving surface of the light detector 8.

The concave mirror 11 converges signal light and is disposed in the middle of an optical path between the light source 5 and the polygon mirror 6. The reflective surface of the concave mirror 11 is directed to the light detector 8 and functions to converge and reflect the light reflected (signal light) from the bar code which is incident on the light detector 8 via the polygon mirror 6. A hole is formed at the middle of the concave mirror 11 so that the laser light emitted from the light source 5 is incident to the polygon mirror 6.

The main PCB 10 is positioned on the bottom surface of the body of the side part 4. The main PCB 10 has mounted thereon a decoding device (not shown), an interface connector 13 used to transmit decoded signals to the POS terminal and other external devices, and a voltage conversion device (not shown) which converts a power source voltage supplied from the outside via an AC adapter (not shown) or the like to a voltage which is suitable for the device. The main PCB 10 controls the lighting of the light source 5, the driving of the polygon mirror 6, motor 12 and the operation of the A/D circuit 9.

The laser light beams projected from the light source 5 are reshaped using a collimator lens and an aperture so that they are provided with the resolving power required to read the bar code, and are then incident on the polygon mirror 6 via the hole in the middle of the concave mirror 11.

As described above, the four reflective surfaces of the polygon mirror 6 all have different slopes so that four parallel scanning lights are generated by the polygon mirror 6. The scanning light from the polygon mirror 6 is projected downward, as shown in the FIG. 1.

The scanning light generated from the polygon mirror 6 is suitably split and reflected from a pattern mirror, which operates as a scanning line splitting means, and which is placed on the bottom part 1 and the side part 4 and is emitted as a scanning pattern from the bottom window 3 and the side window 14. The scanning pattern is comprised of multiple scanning lines which are scanned in different directions. The scanning direction and angle of the respective scanning lines are determined by the slope of the pattern mirror.

Figure 4A:
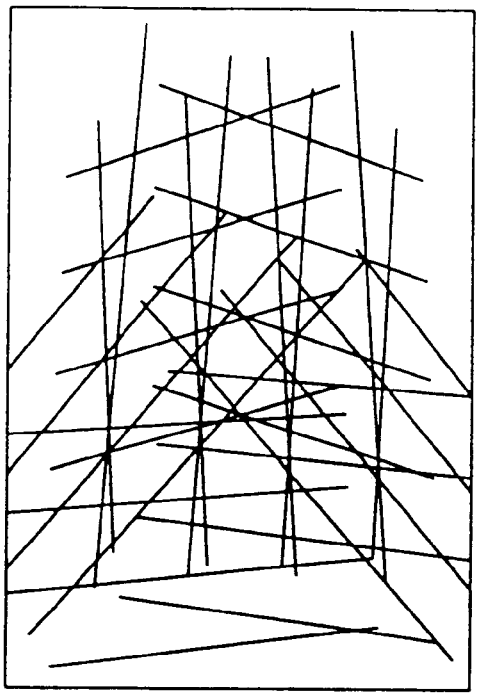
FIG. 4A is a diagram of a bottom pattern emitted from the bar code reader in accordance with the first embodiment of the present invention.
Figure 4B:
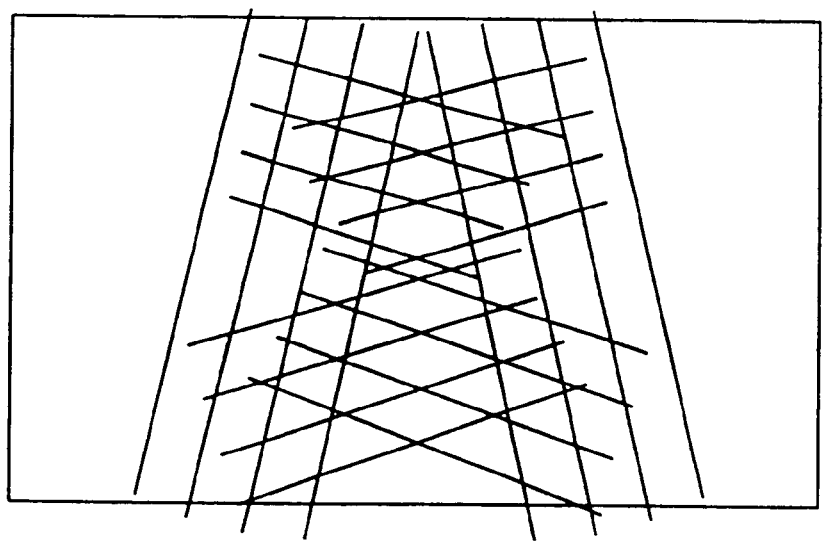
FIG. 4B is a diagram of a side pattern emitted from the bar code reader in accordance with the first embodiment of the present invention.
Figure 5:
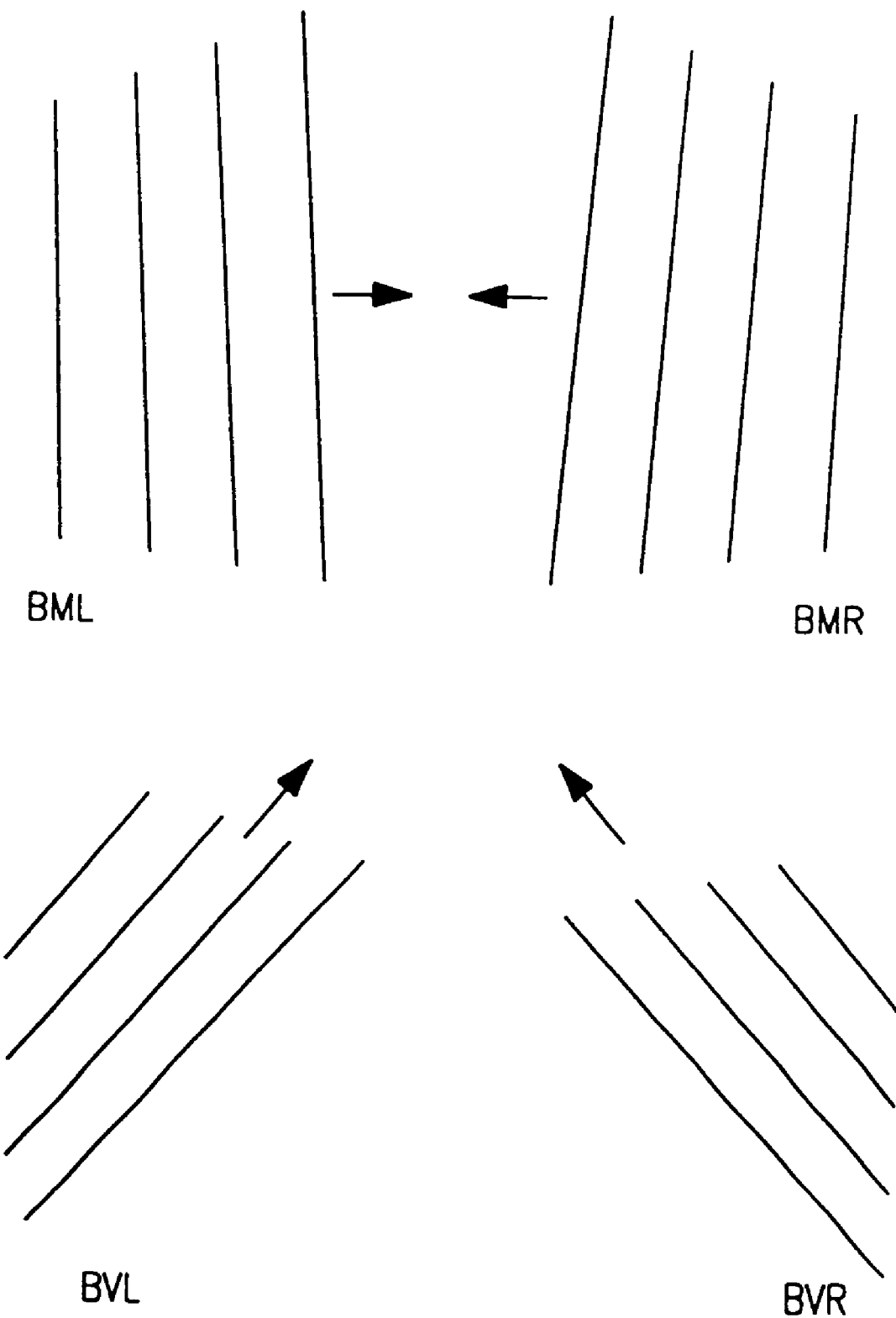
FIG. 5 is a split view of scanning patterns BMR, BML, BVR, and BVL which make up the bottom pattern emitted from the bar code reader in accordance with the first embodiment of the present invention.
Figure 6:
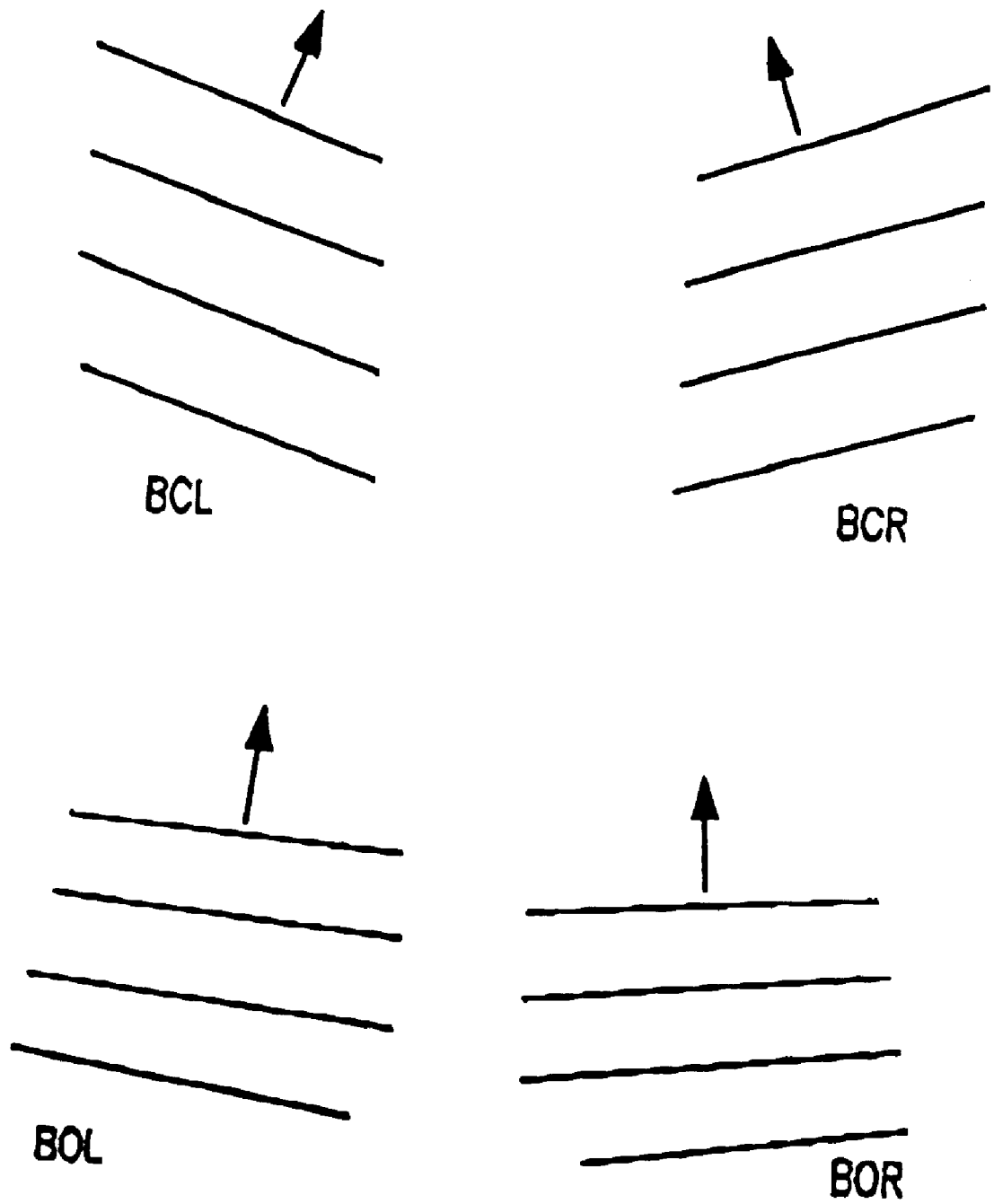
FIG. 6 is a split view of scanning patterns BCR, BCL, BOR, and BOL which make up the bottom pattern emitted from the bar code reader in accordance with the first embodiment of the present invention.
Figure 7:
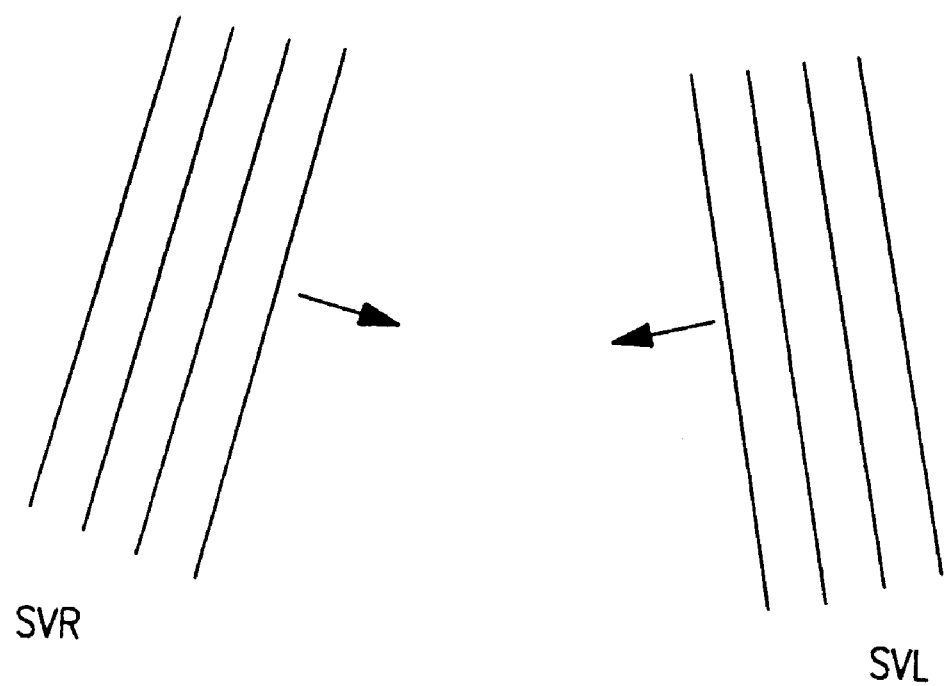
FIG. 7 is a split view of scanning patterns SVR, SVL which make up the side pattern emitted from the bar code reader in accordance with the first embodiment of the present invention.
Figure 8:
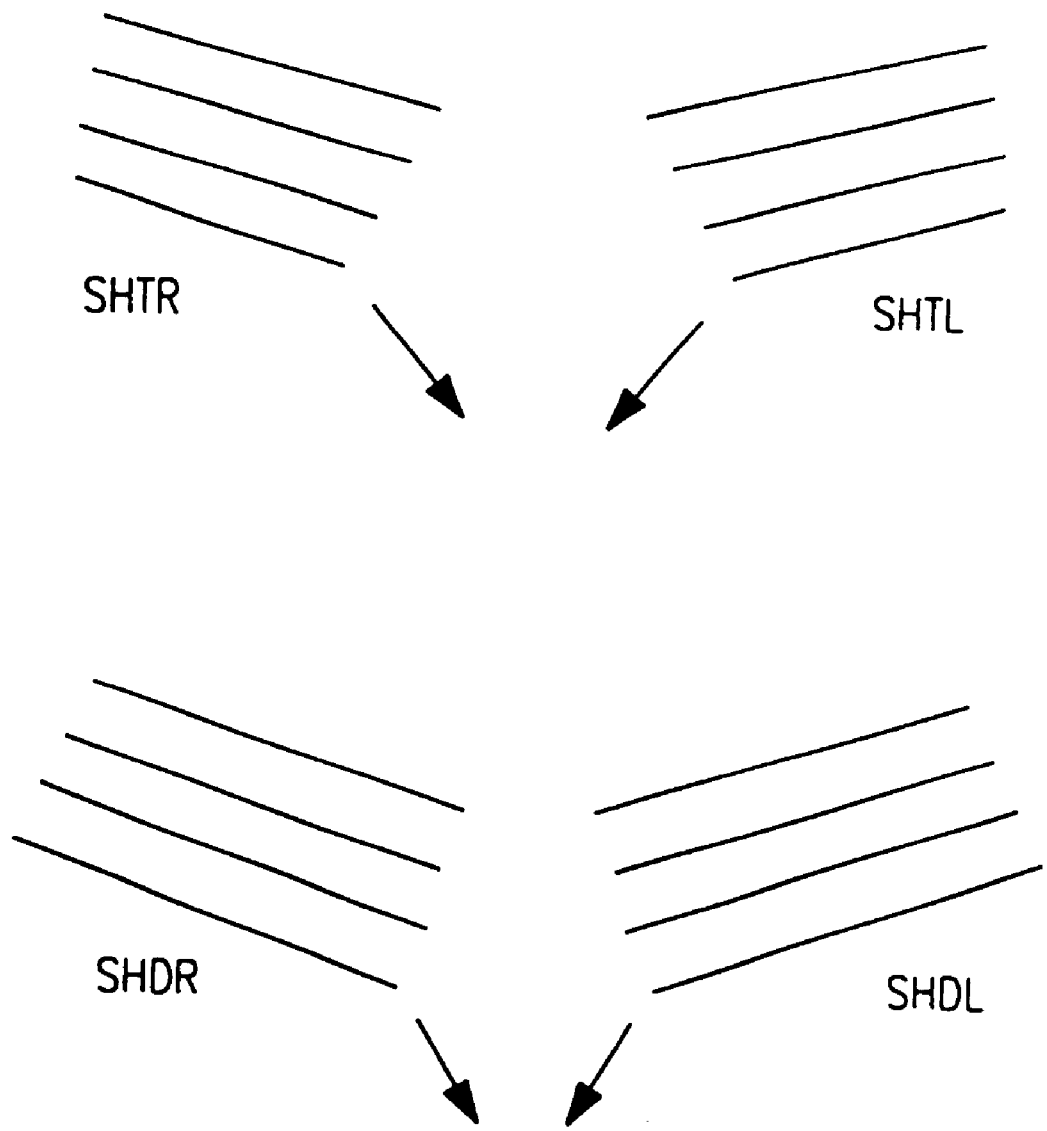
FIG. 8 is a split view of scanning patterns SHTR, SHTL, SHDR and SHDL which make up the side pattern emitted from the bar code reader in accordance with the first embodiment of the present invention.

FIGS. 4A through FIG. 8 are diagrams illustrating the scanning pattern which is output from the bottom window 3 (bottom pattern) and the scanning pattern which is output from the side window 4 (side pattern). More particularly, FIG. 4A is a diagram of the bottom pattern, and FIG. 4B is a diagram of the side pattern at the respective window surfaces. In FIGS. 4A and 4B, the rectangular portion surrounding the scanning pattern is the frame of the window. FIG. 5 and FIG. 6 are diagrams of the scanning patterns which make up the bottom pattern; FIG. 7 and FIG. 8 are diagrams of the scanning patterns which make up the side pattern, the scanning patterns being split respectively.

The bottom patterns and side patterns will now be described below with reference to FIGS. 4–8. The scanning pattern which is output from the bottom window 3 (bottom pattern) is comprised of the following eight (8) scanning patterns BMR, BML, BVR, BVL, BCR, BCL, BOR, BOL. Further, each of the scanning patterns is preferably comprised of four parallel scanning lines. However, the lines forming the scanning patterns do not have to comprise completely parallel scanning lines, although they may be thought of as parallel here, and the same holds true throughout.

FIG. 4A illustrates the overall bottom pattern in the bottom window 3. FIG. 5 and FIG. 6 are diagrams illustrating splitting of various scanning patterns which make up the bottom pattern. More particularly, FIG. 5 illustrates scanning patterns BML, BMR, BVL, BVR. FIG. 6 illustrates scanning patterns BCL, BCR, BOL, BOR. Further, the top part of FIG. 4A illustrates the side near the side window 14. The arrows in FIG. 5 and FIG. 6 indicate the general outgoing direction of each of the scanning patterns on a flat surface.

Of the patterns shown in FIGS. 5 and 6, BVR and BVL are respectively scanned in a to direction which is preferably nearly vertical to the surface of the bottom window 3. The other scanning patterns are scanned in a direction which is preferably nearly parallel to the surface of the bottom window 3. However, the directions of scanning of the scanning patterns are not limited to completely vertical/ horizontal directions, and the directions of scanning may be slightly inclined with respect to vertical and horizonal. However, for purposes of discussion of the present invention, the directions of scanning may both be thought of as vertical/horizontal. Further, the scanning directions of the scanning patterns are not restricted to the ones shown in the figures, but may be varied as is suitable.

As seen particularly in FIG. 6, by contrasting the pair of scanning patterns BOR and BOL, the scanning patterns BOR and BOL are not, strictly speaking, completely symmetrical on the left and right. In the case of BOR and BOL, the scanning positions on the left and right are configured by intentionally moving or adjusting them so as to increase the probability of reading (scanning) the bar code.

As shown in FIGS. 4B, 7 and 8, the scanning pattern output from the side window 14 (side pattern) is comprised of the following six scanning patterns SVR, SVL, SHTR, SHTL, SHDR, SHDL. These six scanning patterns are comprised of four parallel scanning lines.

FIG. 4B is an overall view of the side pattern on the side window 14 surface in accordance with the first embodiment of the present invention. FIG. 7 and FIG. 8 are diagrams illustrating the splitting of each of the scanning patterns which make up the side pattern. In a manner similar to the scanning patterns shown in FIG. 5 and FIG. 6, the arrows in FIG. 7 and FIG. 8 indicate the outgoing direction of each of the scanning patterns on a plane surface.

Of the six scanning patterns shown in FIGS. 7 and 8, SVR and SVL are scanned in a direction which is nearly vertical to the surface of the bottom window 3. The other scanning patterns SHTR, SHTL, SHDR and SHDL are scanned in a direction which is nearly horizontal to the surface of the bottom window 3. Further, in a manner similar to the scanning directions in FIG. 5 and FIG. 6, the actual scanning directions are not completely vertical or horizontal, but are somewhat inclined, as can be seen from FIG. 8. Nevertheless, in accordance with embodiments of the present invention, the scanning patterns can be considered to be scanned in a vertical/horizontal direction.

The outgoing path of the scanning lines which make up the bottom pattern (FIG. 4A) and the side pattern (FIG. 4B) will now be described below.

Although the laser light is emitted toward the polygon mirror 6 from the light source 5, all of the scanning line paths are common up to this point. The scanning light generated from the polygon mirror 6 next scans the pattern mirror in the following sequence SVL1-SHR1-BMR1-BVR1-BZ1-BVL1-BML1-SHL1-SVR1. Further, the pattern mirror is shown in FIG. 4 through FIG. 6.

The first letters of the notation attached to the pattern mirror indicate whether the pattern mirror corresponds to the bottom pattern or the side pattern. The pattern mirror which begins with the letter B corresponds to the bottom pattern, and the pattern mirror which begins with the letter S corresponds to the side pattern. Further, with respect to the notation of the pattern mirror, the letter V indicates that the related scanning pattern is scanned in a vertical direction; the letter H indicates that the related scanning pattern is scanned in a horizontal direction; the letter L indicates that the related scanning pattern is emitted from the left side of the scanner; the letter R indicates that the related scanning pattern is emitted from the right side of the scanner; the letter T indicates that the related scanning pattern is emitted from the top side (upper portion) of the side window; and the letter D indicates that the related scanning pattern is emitted from the bottom side (lower portion) of the side window. The letters Z and M do not have any specific meaning.

The reflecting surfaces of the pattern mirrors are directed toward the polygon mirror 6 and are disposed in a fan shape. The pattern mirror corresponding to the bottom pattern reflects scanning light incident from the polygon mirror 6 to the bottom part 1, and the pattern mirror corresponding to the side pattern reflects scanning light incident from the polygon mirror 6 to the side part 4.

The bottom pattern mirror which generates the bottom pattern is disposed on the bottom part of the device and comprises the following mirrors. BZ1, BVR1, BVL1, BMR1, BML1, BMR2, BML2, BMR3, BML3, BMR4, BML4, BHR2, BHL2, BZ2, BZR3, BZL3.

These mirrors are disposed so that they are nearly symmetrical to the centerline of the device. Of these, the five mirrors BZ1, BVR1, BVL1, BMR1 and BML1 are disposed on the bottom of the side part 4 and their reflective surfaces are directed toward the bottom part 1. The four mirrors BZR3, BZL3, BMR4, BML4 are disposed on the bottom surface of the bottom part 1. The respective reflective surfaces of the seven mirrors BMR2, BML2, BMR3, BML3, BHR2, BHL2 and BZ2 are inclined slightly downward and are disposed on the side wall of the bottom part 1.

Furthermore, the outside parts of the mirrors BZR3 and BZL3 are respectively inclined somewhat upwards, as is shown in FIG. 3. By inclining the mirrors BZR3 and BZL3 upwards, a space can be ensured between the bottom of the bottom part 1 and the pattern mirror (for example, BZL3). A cable or the like may be set in place in the space between the bottom of the bottom part 1 and the pattern mirror (in FIG. 3, the cable is a dark circle). Pattern mirrors BMR4 and BML4 are also provided with the same type of incline as pattern mirrors BZR3 and BZL3.

The scanning line which makes up the bottom pattern is first reflected from the polygon mirror 6 and then is emitted from the bottom window 3 after traveling through the following paths.

BMR: polygon-BMR1-BMR2-BMR3-BMR4-bottom window

BML: polygon-BML1-BML2-BML3-BML4-bottom window

BCR: polygon-BZ1-BZ2-BZR3-bottom window

BCL: polygon-BZ1-BZ2-BZL3-bottom window

BOR: polygon-BZ1-BHR2-BZR3-bottom window

BOL: polygon-BZ1-BHL2-BZL3-bottom window

BVR: polygon-BVR1-BHR2-BZR3-bottom window

BVL: polygon-BVL1-BHL2-BZL3-bottom window

As can be seen from the above, the paths BCR (BCL) and BOR (BOL) use the same two pattern mirrors BZ1 and BZR3 (BZL3), the only difference being the path of part of BZ2 and BHR2 (BHL2) between them. In a similar manner, the paths BOR (BOL) and BVR (BVL) both use the same two pattern mirrors BHR2 (BHL2) and BZR3 (BZL3), so that BZ1 and BVR1 (BVL1), which are the pattern mirrors in which the scanning light scanned from the polygon mirror 6 is first incident, are different.

Thus, although different scanning lines use two pattern mirrors in common, the number of pattern mirrors which must be accommodated inside the bottom part 1 can be reduced by adopting the above configuration. Therefore, in accordance with the present invention, since the overall number of pattern mirrors is reduced, if the mirrors are accommodated inside the same space, the area per single mirror can be increased and the converging efficiency of the light reflected from the bar code can be upgraded.

Although the pattern formed by the paths BOR (BOL) and BVR (BVL) delineates in particular the scanning locus, prior to the present invention there has been no device in which scanning lines with completely different scanning loci are reflected from a common pattern mirror in the manner described above in accordance with the present invention.

The side pattern mirror which generates the side pattern is comprised of the following mirrors SVR1, SVL1, SVR2, SVL2, SHR1, SHL1, SHTR2, SHTL2, SHTR3, SHTL3, SHDR2, SHDL2, SHDR3, SHDL3.

The pattern mirrors which generate the side pattern are disposed so that they are nearly symmetrical to the middle line of the device in the same manner as the bottom pattern mirror. Furthermore, the four pattern mirrors SHTR2, SHTL2, SHDR2, SHDL2 are disposed with the respective reflecting sides pointed downwards.

The respective scanning patterns which make up the side pattern are first scanned by the polygon mirror 6 and then are emitted from the side window 14 after traveling through the following paths.

SVR: polygon-SVR1-SVR2-side window
SVL: polygon-SVL1-SVL2-side window
SHTR: polygon-SHR1-SHTR2-SHTR3-side window
SHTL: polygon-SHL1-SHTL2-SHTL3-side window
SHDR: polygon-SHR1-SHDR2-SHDR3-side window
SHDL: polygon-SHL1-SHDL2-SHDL3-side window As can be seen from the above, SHRI (SHL1) is used as a common mirror in SHTR (SHTL) and SHDR (SHDL).

Figure 9:
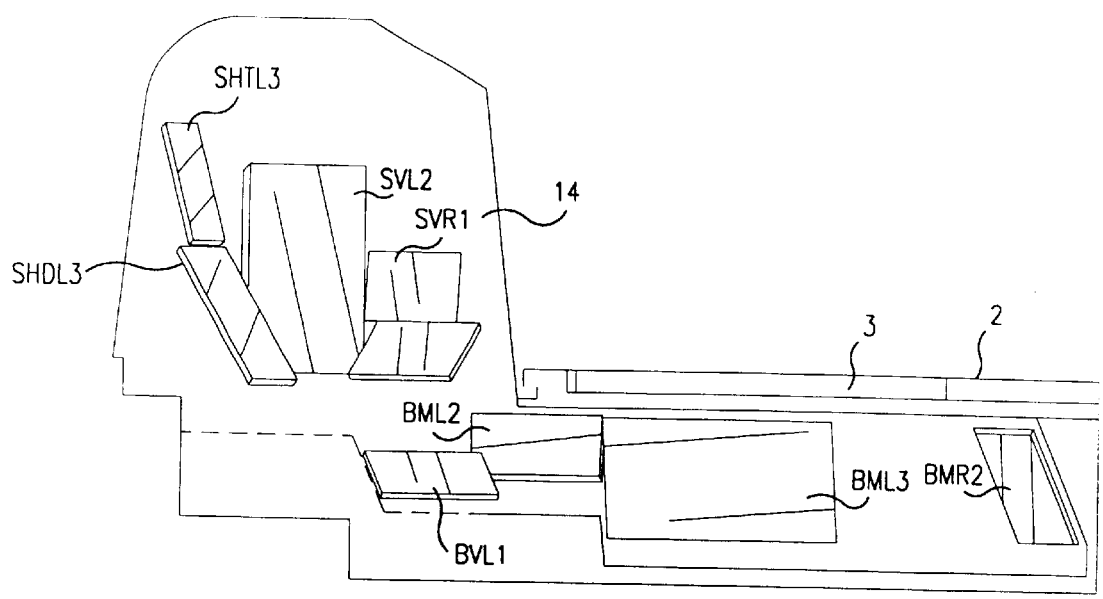
FIG. 9 is an internal side view of the bar code reader showing placement of specific pattern mirrors in accordance with the first embodiment of the present invention.

FIG. 9 is an internal side view of the bar code reader showing placement of specific pattern mirrors in accordance with the first embodiment of the present invention. The straight lines drawn in each of the pattern mirrors indicate the scanning locus of the scanning line in each of the pattern mirrors. The two outermost scanning lines of the four parallel scanning lines are indicated. Further, although the two scanning lines drawn in BML3 in the figure are not strictly parallel, they may be considered "parallel" for all intents and purposes. As shown in FIG. 9, it can be seen that of the pattern mirrors shown in FIG. 9, BHR2 is scanned by two types of scanning lines which are nearly vertical to a nearly horizontal plane.

Figure 10:
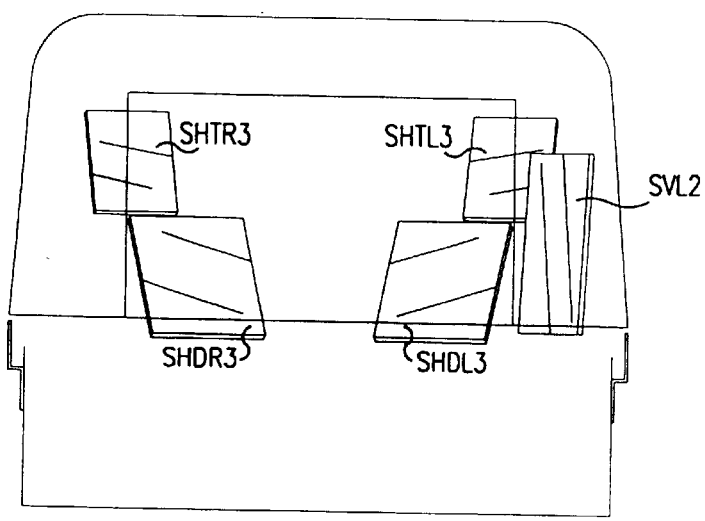
FIG. 10 is an internal frontal view of the bar code reader showing placement of specific pattern mirrors in accordance with the first embodiment of the present invention.

FIG. 10 is an internal frontal view of the bar code reader showing placement of specific pattern mirrors in accordance with the first embodiment of the present invention. More particularly, FIG. 10 shows only a specified pattern mirror, specifically, the pattern mirror which is accommodated inside the body of the side part 4. Further, pattern mirror SVR2 is not shown in FIG. 10, which forms a pair with the pattern mirror SVL2. The locus of the scanning line is delineated by the unbroken line in the pattern mirror which is shown in FIG. 10.

Figure 11:
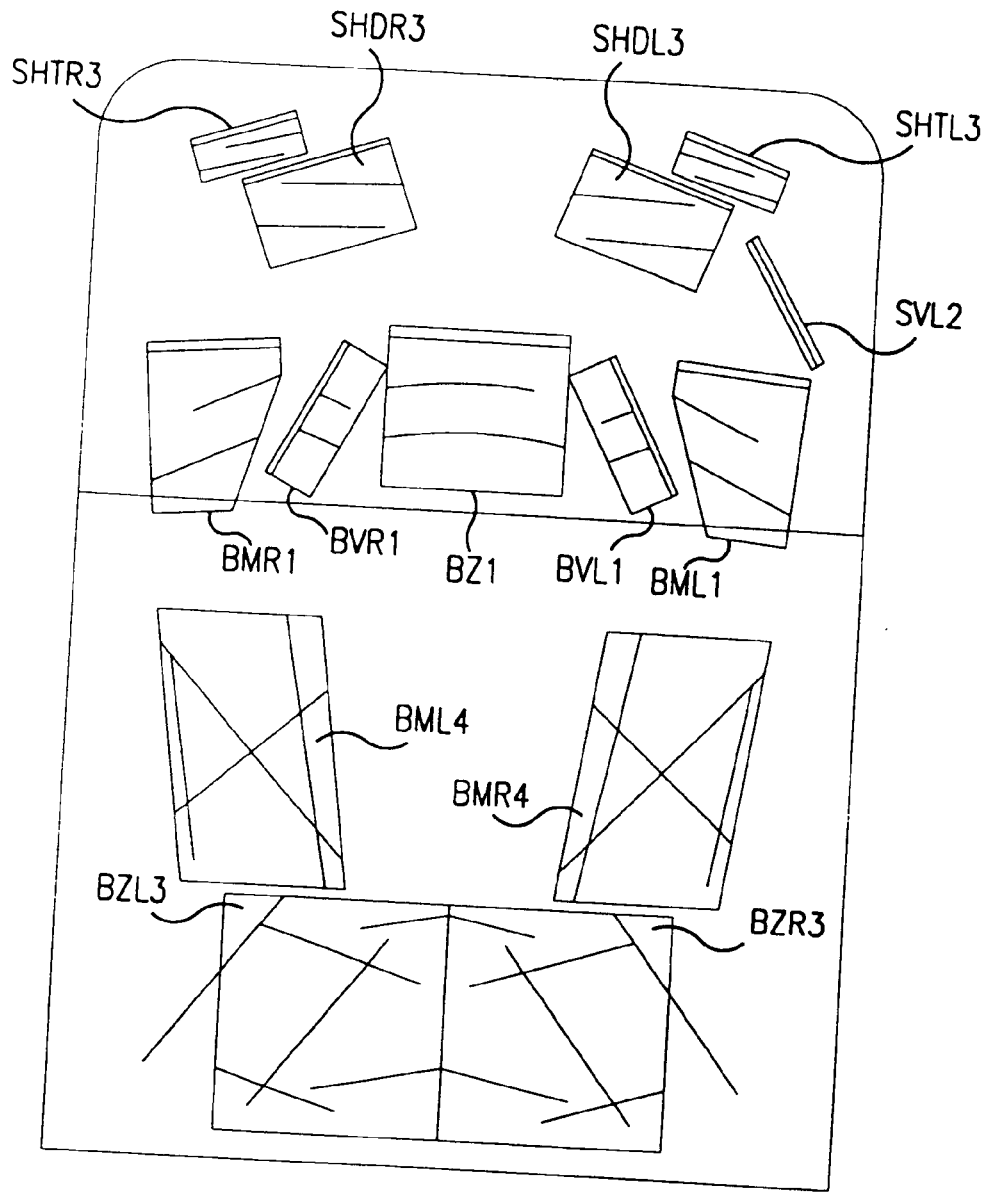
FIG. 11 is an internal upper view of the bar code reader showing placement of specific pattern mirrors in accordance with the first embodiment of the present invention.
Figure 12:
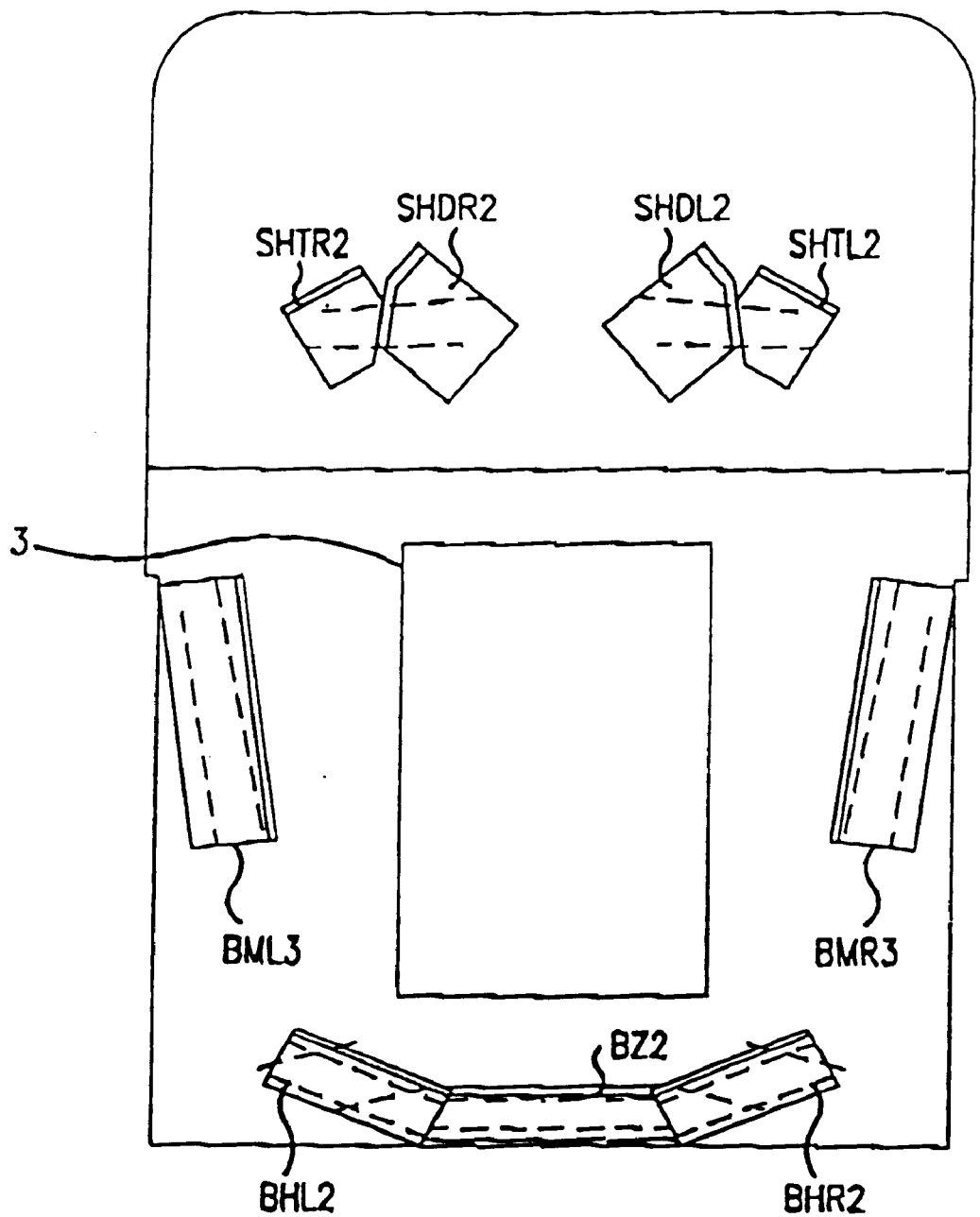
FIG. 12 is an internal upper view of the bar code reader showing placement of specific pattern mirrors in accordance with the first embodiment of the present invention.

FIG. 11 and FIG. 12 are internal upper views of the bar code reader showing placement of specific pattern mirrors in accordance with the first embodiment of the present invention. More specifically, FIG. 11 shows the respective pattern mirrors having reflective surfaces which face upwards, while FIG. 12 shows the respective pattern mirrors having reflective surfaces which face downward.

As shown in FIG. 11, BZL3 and BZR3 are scanned by a total of three scanning lines which intersect each other, while BML4 and BMR4 are also scanned by three types of scanning lines which intersect each other to form a right angle.

Since the reflective surfaces of the pattern mirrors face downward in FIG. 12, the locus of the scanning line which scans the pattern mirrors is indicated by a dotted line. As shown in FIG. 12, of the pattern mirrors illustrated in FIG. 12, BHR2 and BHL2 are scanned by two types of intersecting scanning lines.

Figure 13:
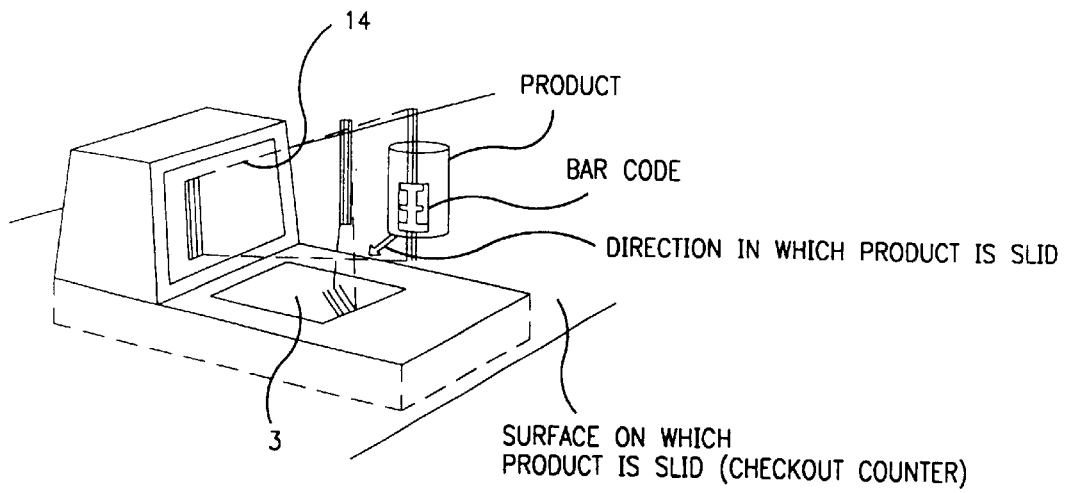
FIG. 13 is an explanatory diagram of a reading process when a bar code is vertical to the bottom window in accordance with embodiments of the present invention.

FIG. 13 is an explanatory diagram illustrating a locus scanned by the scanning pattern during a bar code reading process when the bar code is vertical to the bottom window 3 in accordance with the first embodiment of the present invention. In the situation shown in FIG. 13, the bar code should be scanned from the scanning pattern which nearly coincides with the direction of the bar code, that is, the scanning pattern which is emitted toward the bar code and which is scanned vertically to the bottom window 3. More specifically, these are (1) both patterns SVR and SVL which are emitted from the side window 14 and (2) both patterns BVR and BVL which are emitted from the bottom window 3.

As shown in FIG. 13, a product with a bar code attached is moved from the right of the device to the left side toward the side window 14. There are four cases which can be conceived when the bar code is moved as shown in FIG. 13: (1) when the bar code is nearly facing the side window 14; (2) when the bar code faces the direction in which the product is moved; (3) when the bar code faces a direction opposite to that in which the product is moved; and (4) when the bar code faces the operator (not facing the side window 14).

FIGS. 14A–14D are diagrams illustrating a relationship between the bar code and the scanning pattern which scans the bar code for the four cases indicated above in accordance with embodiments of the present invention.

Figure 14A:
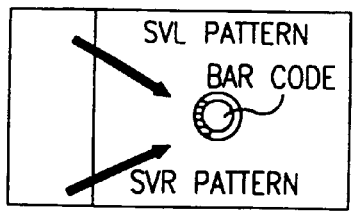
FIGS. 14A–14D are diagrams illustrating relationships between the bar code and the scanning pattern scanning the bar code when the reading process shown in FIG. 13 is performed in accordance with embodiments of the present invention.

More particularly, FIG. 14A is a diagram illustrating the case in which the bar code faces the side window 14. In this case, the bar code is scanned from the SVR pattern and SVL pattern emitted from the side window 14 and then read.

Figure 14B:
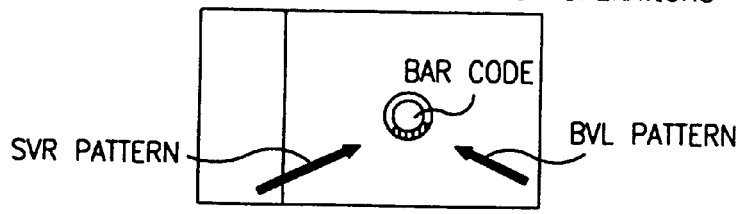

FIG. 14B is a diagram illustrating the case in which the bar code faces the direction in which the product is moved. In this case, the bar code is scanned from the SVR pattern emitted from the side window 14 and the BVL pattern emitted from the bottom window 3.

Figure 14C:
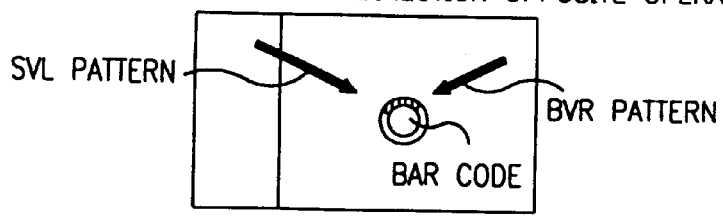

FIG. 14C is a diagram illustrating the case in which the bar code faces the direction opposite to that in which the product is moved. In this case, the bar code is scanned from the SVL pattern emitted from the side window 14 and the BVR pattern emitted from the bottom window 3.

Figure 14D:
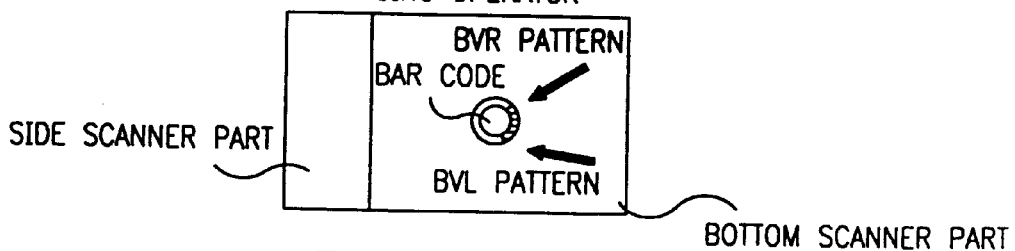

FIG. 14D is a diagram illustrating the case in which the bar code faces the operator. In this case, the bar code is not scanned by the scanning line emitted from the side window 14. Instead, the bar code is scanned and read by the BVR pattern and the BVL pattern which are emitted facing the side window 14.

Thus, as shown in FIGS. 14A–14D, 360° reading of the bar code is made possible regardless of the direction in which the bar code faces.

Figure 15:
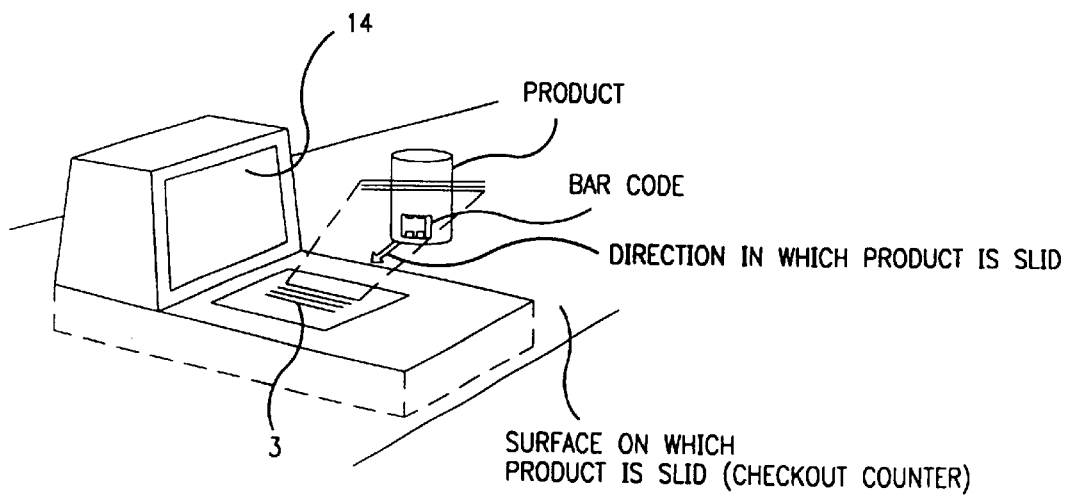
FIG. 15 is an explanatory diagram of a reading process when the bar code is placed parallel to the bottom window in accordance with embodiments of the present invention.

FIG. 15 is an explanatory diagram illustrating a process for reading a bar code when the bar code is placed parallel to the bottom window 3 and which indicates the scanning locus scanned by the scanning pattern when the bar code is nearly horizontal to the bottom window 3 in accordance with embodiments of the present invention. In FIG. 15, the bar code is scanned using the scanning pattern scanned in a direction which is parallel to the bottom window 3. Further, the direction in which the product is moved has the same conditions as that shown in FIG. 13, specifically, the product is moved from the right of the device to the left side toward the side window 14.

There are four cases which can be conceived of in the situation shown in FIG. 15: (1) when the bar code faces the side window 14; (2) when the bar code faces the direction in which the product is moved; (3) when the bar code faces the direction opposite to that in which the product is moved; and (4) when the bar code faces the operator.

FIGS. 16A–16D are diagrams illustrating the relationships between the bar code and the scanning pattern which scans the bar code for the four cases indicated above for FIG. 15 in accordance with embodiments of the present invention.

Figure 16A:
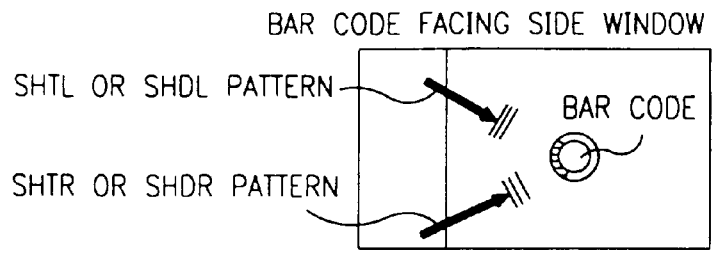
FIGS. 16A–16D are diagrams illustrating relationships between the bar code and the scanning pattern scanning the bar code when reading process shown in FIG. 15 is performed in accordance with embodiments of the present invention.

More particularly, FIG. 16A is a diagram illustrating the case when the bar code faces the side window 14. In this case, the bar code is scanned by the SHTR pattern, the SHDR pattern, the SHTL pattern or the SHDL pattern which are emitted from the side window 14. Further, in the case shown in FIG. 16A, SHTR and SHDR, SHTL and SHDL, which delineate virtually the same scanning locus, are not indicated as split in the figure.

Figure 16B:
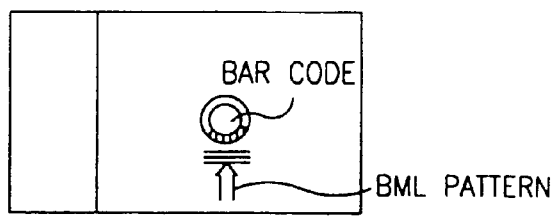

FIG. 16B is a diagram illustrating the case in which the bar code is facing the direction in which the product is moved. In this case, the bar code is scanned by the BML pattern which is emitted from the bottom window 3 facing the direction in which the product is moved.

Figure 16C:
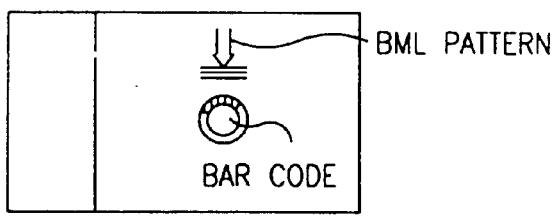

FIG. 16C is a diagram illustrating the case in which the bar code faces the direction opposite to that in which the product is moved. In this case, the bar code is scanned by the BMR pattern which is emitted from the bottom window 3.

Figure 16D:
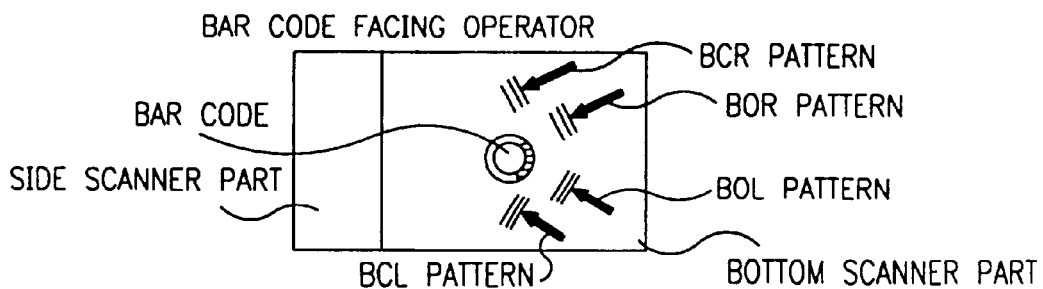

FIG. 16D is a diagram illustrating the case in which the bar code faces the operator. In this case, the bar code is not scanned by the scanning pattern emitted from the side window 14. Instead, the bar code is scanned by each of the patterns in BOR, BCR, BCL and BOL which are emitted from the bottom window 3 toward the side window 14.

Thus, in accordance with the present invention, 360° reading is made possible, even if the bar code is positioned horizontally to the bottom window 14.

In FIGS. 14 and 16, the BVR (BVL) pattern, which delineates a scanning locus which is nearly vertical to the bottom window 14, and the BOR (BOL) pattern, which delineates a scanning locus which is nearly parallel to the bottom window 14, are emitted respectively from the bottom window 14 in nearly the same direction. In other words, although these scanning patterns delineate different scanning loci, they scan the bar code under virtually the same to conditions. Therefore, the same bar code can be read even if the bar code is vertical to the bottom window 14 and even if the bar code is horizontal to the bottom window 14.

As a result, in accordance with preferred embodiments of the present invention, complete 360° reading is provided even if the bar code is positioned vertically to the bottom window 14 and even if the bar code is positioned horizontally to the bottom window 14. It is also possible to make the bottom scanner part 1 thinner than the prior art multi-head scanner. Specifically, the thickness of the bottom scanner part 1 can be made so that it is 90 mm or less.

Thus, in accordance with preferred embodiments of the present invention, scanning lines which scan a virtual flat surface which is nearly parallel to the side window 3 in the reading area can be generated from the bottom scanning part 1. This is achieved in accordance with the preferred embodiments because the polygon mirror 6 is disposed on the upper part of the body of the side part 4, and the mirror which is used to generate part of the horizontal scanning line inside the body of the bottom part 1 is shared. Therefore, space inside the bottom part 1 is used effectively. More specifically, in accordance with preferred embodiments, two or more different scanning patterns comprising a horizontal pattern and a vertical pattern share the same two pattern mirrors in the optical path which extends to the reading opening (window) from the polygon mirror 6. A bar code reader with this type of configuration did not exist in the prior art.

In accordance with the preferred embodiments, lengthening the distance from the polygon mirror 6 to the body of the bottom part 1 is extremely effective and advantageous in generating scanning lines with a scanning line length which is longer than at the same scanning angle. Furthermore, this configuration is also extremely useful in that it maintains a space inside the bottom part 1 and makes it possible to increase the area of the pattern mirror or the number of pattern mirrors used.

In prior art bar code readers, which are configured to generate scanning lines using a single laser beam, the length of the optical path from a polygon mirror to the window of the reader is short so that it is impossible to obtain scanning lines which are sufficiently long. For this reason, with prior art bar code readers, it is impossible to generate scanning lines which vertically scan the virtual plane surface described above from the bottom part. However, as noted above, in accordance with the preferred embodiments of the present invention, scanning lines which vertically scan the virtual plane surface from the bottom part 1 can be generated.

Furthermore, the pattern mirror used in prior art bar code readers to generate scanning lines which scan the virtual plane surface vertically cannot be assured the space needed to accommodate and place the pattern mirror inside the body part. Moreover, the prior art bar code readers cannot achieve the scanning lines which vertically scan the virtual plane surface in accordance with the preferred embodiments of the present invention because the light beams of the prior art bar code readers are incident to the prior art polygon mirror from a single direction.

In accordance with the preferred embodiments of the present invention, the polygon mirror 6 has four reflecting surfaces (facets). However, the polygon mirror 6 is not limited to four (4) reflecting surfaces, and may have, for example, three (3) reflecting surfaces or five (5) or more reflecting surfaces.

When the number of reflecting surfaces of the polygon mirror 6 is reduced, a proportionately larger scanning angle is obtained. For example, when the polygon mirror 6 has four (4) reflecting surfaces, the scanning angle can be 180°. On the other hand, when the polygon mirror 6 has three reflecting surfaces, the scanning angle can be 240°. Thus, if the scanning angle is a priority, the fewer the reflecting surfaces the better the result. If the scanning angle is large, scanning lines can be generated with a proportionately larger scanning line length when compared with the same optical path length.

When the polygon mirror 6 has fewer reflecting surfaces, the number of scanning lines which can be generated with a single scanning declines. For example, when a polygon mirror 6 having three reflecting surfaces is used, three scanning lines are generated, while four scanning lines can be generated when a polygon mirror 6 having four reflecting surfaces is used.

When the number of scanning lines increases, the space between each of the scanning lines narrows proportionately. Conversely, when the number of scanning lines decreases, there is a wider space between each of the scanning lines. In the latter case, if a so-called "truncated label" with a low back is read, problems may arise, such as the bar code being missed between the scanning lines and not being read at all. If the space between the scanning lines is narrowed to prevent missing the bar code between scanning lines, the scanning range from a scanning pattern with fewer scanning lines may become narrower and may not be able to ensure a sufficient reading area.

When a polygon mirror 6 with four surfaces is used, the scanning angle is smaller than a polygon mirror 6 with three surfaces so that a proportionately longer scanning line optical path is required to obtain scanning lines with the same length. In accordance with the preferred embodiments of the present invention, the polygon mirror 6 is set in place near the top of the body of the side part 4 so that the distance between the polygon mirror 6 and the bottom part 1 can be increased and the length of the optical path lengthened accordingly. As a result, in accordance with preferred embodiments of the present invention, scanning lines with a sufficient scanning line length can be obtained, even if a four-surface polygon mirror 6 having a small scanning angle is used.

When the number of reflecting surfaces of the polygon mirror 6 is increased to five or more surfaces, the scanning angle is shortened even further. In this case, the polygon mirror 6 is suitable for use if an optical path is obtained which is longer than the device with a polygon mirror 6 having four reflecting surfaces.

Further, in accordance with the preferred embodiments of the invention described above, scanning patterns having two pattern mirrors in common are used only in the bottom part 1. However, scanning patterns having two pattern mirrors in common may be used for the side pattern mirrors as well. Furthermore, different scanning patterns with three or more pattern mirrors in common may also be used.

As shown in FIGS. 1–3, in accordance with the preferred embodiments of the present invention, the device includes a speaker 15 which emits a sound indicating whether or not the bar code has been read and which is located on the top of the body of the side part 4.

Prior art multi-head scanners have speakers which are located near the bottom of the side of the device. Nevertheless, in accordance with the prior art device, the side of the device is embedded in the counter so that the speaker is covered by the counter. As a result, the prior art device has problems in that it is difficult for the operator to confirm the sound indicating whether or not the bar code had been read. For example, since the area around supermarket checkout counters is rather noisy, the volume of the sound coming from the speaker has to be high. Therefore, it is impossible for the prior art speaker to emit sufficient volume because it is hidden away beneath the counter. Although the volume of the speaker can be increased by increasing the size of the speaker, prior art speakers which are mounted on multi-head scanners are not large enough, so that this manner of attacking the problem is not very effective.

In contrast, because the speaker in accordance with the preferred embodiments of the present invention is attached to the front of the top of the body of the side part 4, a sound which has sufficiently high volume for the operator to tell whether or not the bar code has been read can be emitted despite a small diameter of the speaker. Furthermore, since there is also directivity in the direction in which the sound is transmitted, attaching the speaker to the front of the device rather than to the side is effective when sound transmission is taken into consideration.

An explanation of why the speaker can be attached to the front of the top of the body of the side part 4 in the device in accordance with the preferred embodiments of the invention will now be provided below.

In prior art multi-head scanners, the pattern mirrors are placed wherever there is sufficient space. For example, in the prior art multi-head scanner, pattern mirrors are disposed both on the top and on the side of the body of the side part. In accordance with the prior art, as long as the desired reading ability can be obtained, priority is given to the placement of the pattern mirrors and other optical parts. Parts which do not particularly affect the speaker and the readout itself are attached as an afterthought in an open space after the optical parts are set in place. Therefore, in prior art multi-head scanners, speakers are attached on the side of the body of the device and underneath the counter.

In accordance with the preferred embodiments of the present invention, the polygon mirror 6 is disposed on the top of the body of the side part 4, and the rotation axis is disposed so that it is nearly horizontal in the device. As a result, optical parts cannot be disposed at positions which close off the optical path of the light which is incident to or incident from the polygon mirror 6. As can be seen from FIG. 2 and FIG. 3, in accordance with the preferred embodiments of the present invention, the pattern mirror is not disposed at the center of the side part 4, and, more particularly, the pattern mirror is not disposed near the top of the side part 4.

In accordance with preferred embodiments of the present invention, the speaker 15 is disposed in a space where there is no pattern mirror and is near the top of the body of the side part 4. This is a secondary effect of the placing of the polygon mirror 6 in accordance with the present invention. The same holds true even for devices which use buzzers and the like instead of speakers.

In accordance with preferred embodiments of the present invention, when the speaker 15 is placed on the top of the body of the side part 4 there is a greater degree of freedom in disposing the pattern mirror and other optical parts inside the bottom part 1. Considering this point alone, the polygon mirror 6 and other scanning means need not be parallel to the surface of the bottom part 1. Rather, it is possible to increase the extent to which the optical parts can be disposed if scanning light is emitted (reflected) downward. Accordingly, the rotation axis may alternatively be vertical to the surface of the bottom part 1 as a result of the shape of the polygon mirror 6.

Furthermore, the scanning device need not be placed near the top end of the body of the to side part 4 if accommodation of the scanning device inside the body of the side part 4 is taken into consideration independently. For example, the preferred embodiments of the present invention do not preclude the possibility of placing the scanning device near the bottom of the body of the side part 4 to fit the design. When the scanning device in accordance with the present invention is placed near the bottom of the body of the side part 4, an effective reflecting surface faces upward and the scanning device may emit scanning light upwards.

In accordance with embodiments of the present invention, other types of scanning devices may be used, such as a galvanomirror and a vibration mirror. Moreover, disks using diffraction lattices may be used in addition to mirrors. The diffraction lattices may be the reflective type or the permeation type.

If these points are taken into consideration, the light beams from the light source need not be emitted vertically to the surface of the bottom part 1. In accordance with preferred embodiments of the present invention, light beams are emitted upward vertically to the surface of the bottom part 1 out of consideration for the placement of the pattern mirrors. However, the light beams need not be emitted vertically to the surface of the bottom part 1, and the light beams may be incident from the side as long as there are no problems with the disposition of the pattern mirrors.

Figure 17:
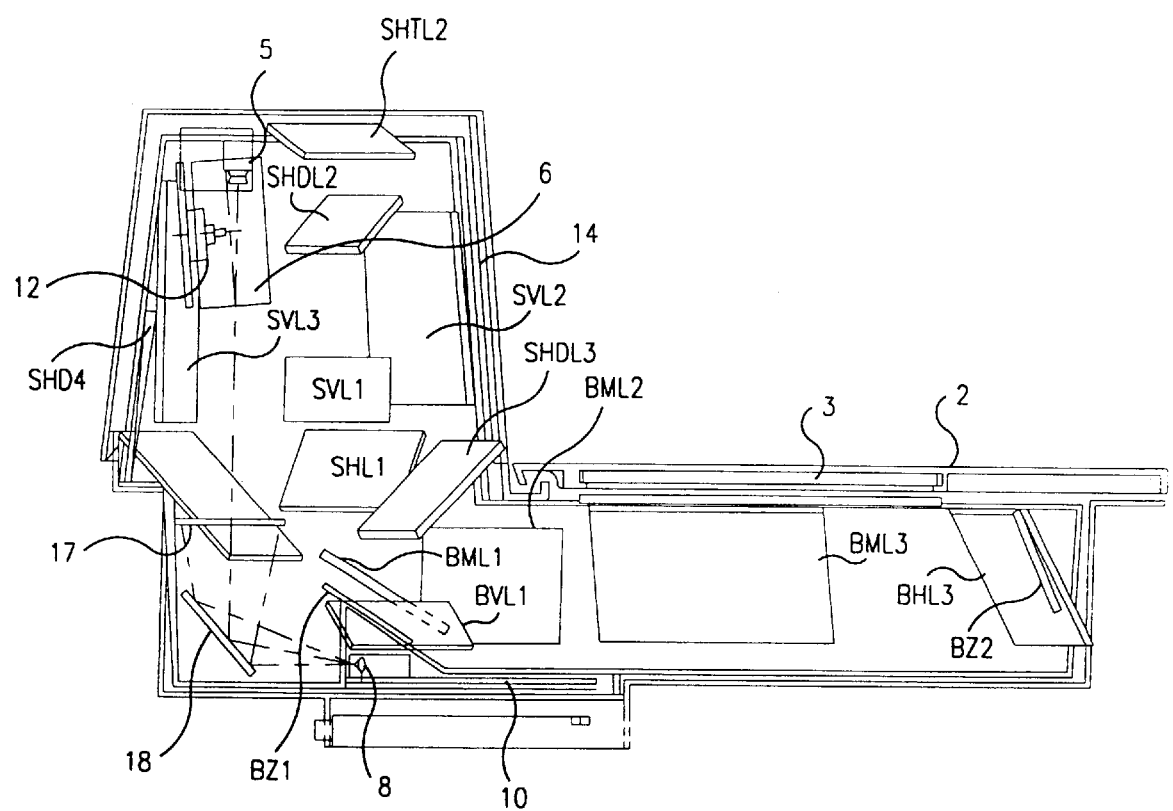
FIG. 17 is an internal side view of a bar code reader in accordance with a second H) embodiment of the present invention.
Figure 18A:
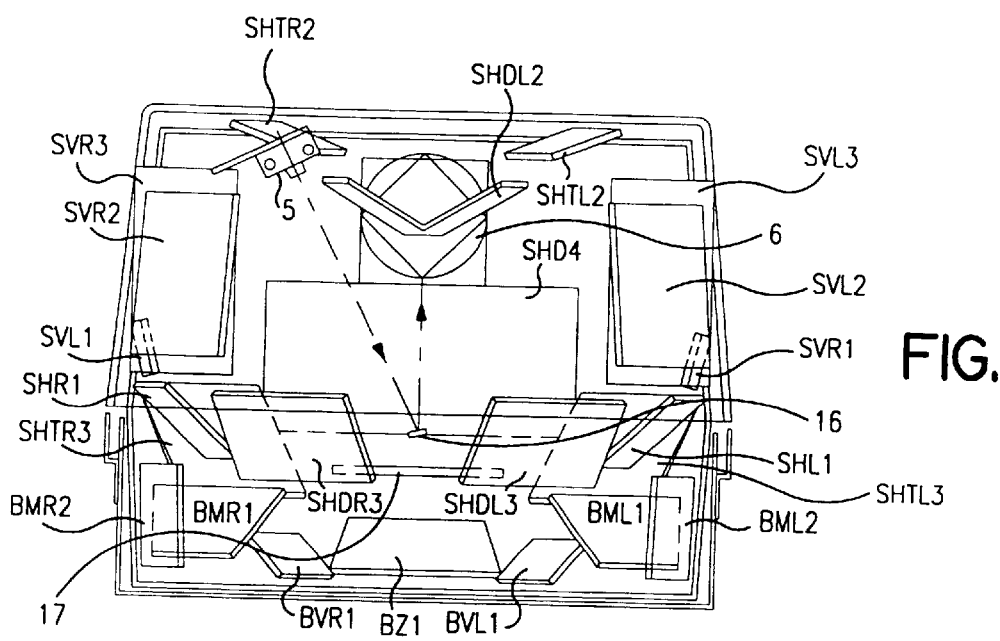
FIG. 18 is an internal upper view of the bar code reader in accordance with the second embodiment of the present invention.
Figure 18B:
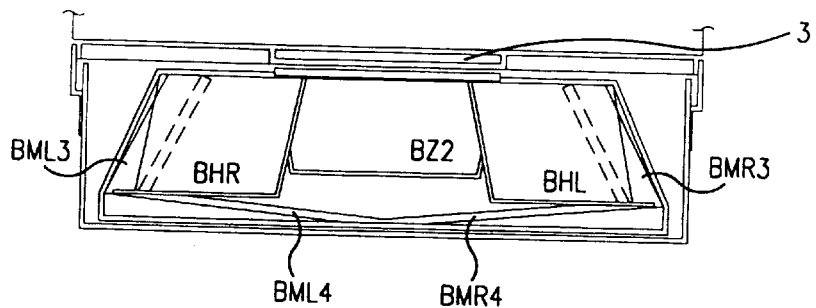
Figure 19:
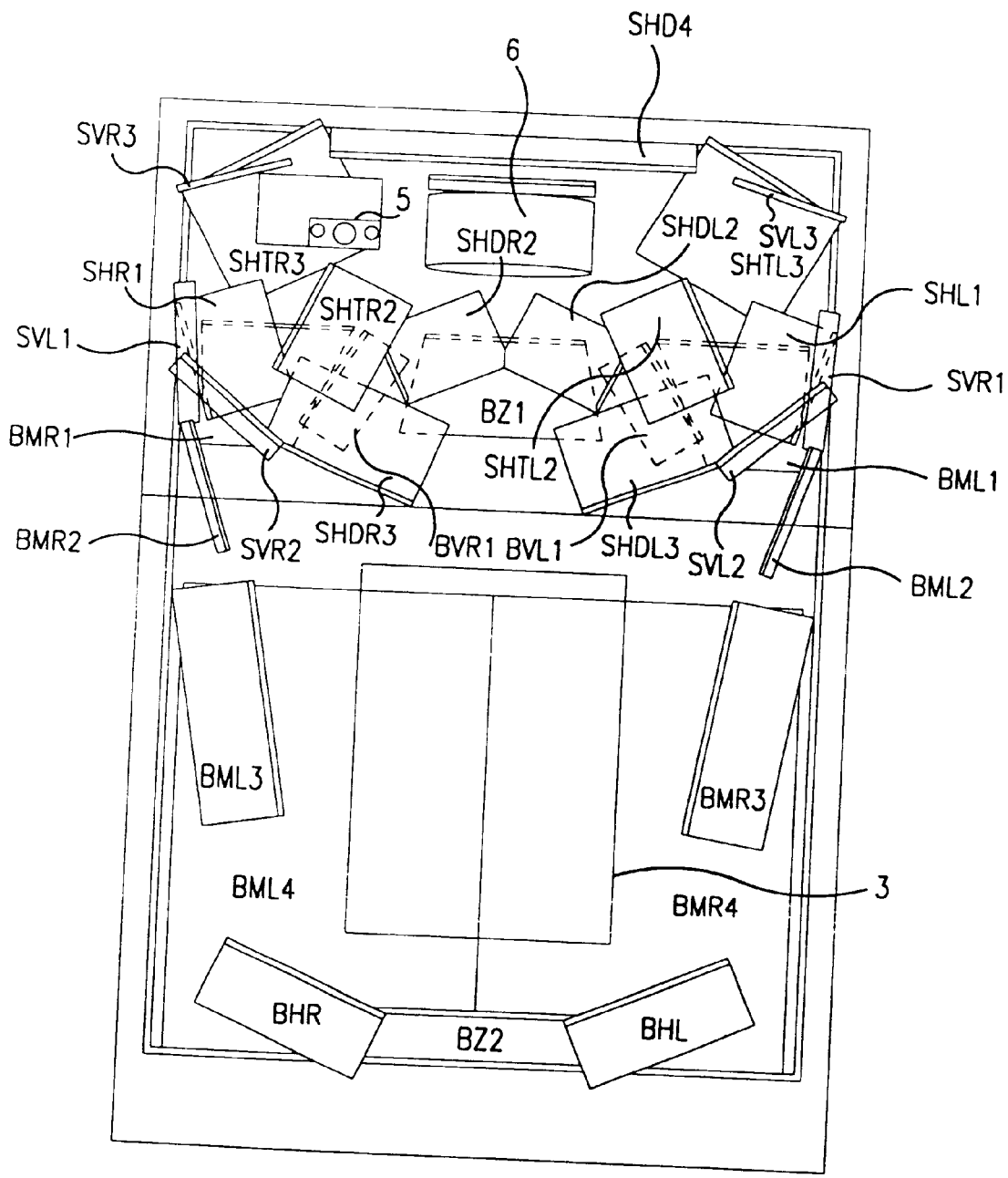
FIG. 19 is an internal frontal view of the bar code reader in accordance with the second embodiment of the present invention.

FIGS. 17–19 are diagrams illustrating an internal view of a bar code reader in accordance with a second embodiment of the present invention. More particularly, FIG. 17 is an internal side view, FIG. 18 is an internal upper view, and FIG. 19 is an internal frontal view of the bar code reader in accordance with the second embodiment of the present invention. Elements shown in FIGS. 17–19 which are the same as or similar to elements described above with reference to the first embodiment of the invention are referred to with like reference numerals.

The device shown in FIGS. 17–19 has virtually the same outward appearance as the device shown in FIGS. 1–3. A primary difference between the device shown in FIGS. 1–3 and the device shown in FIGS. 17–19 is found in the disposition of the optical parts inside the device and the outgoing scanning pattern. The differences between the device shown in FIGS. 17–19 and the device shown in FIGS. 1–3 will now be discussed in detail below.

In accordance with the second embodiment of the present invention, the polygon mirror 6 shown in FIGS. 17–19 is positioned on top of the body of the side part 4. The polygon mirror 6 is the same as the polygon mirror 6 shown in FIGS. 1–3 in that the polygon mirror 6 has four reflective surfaces. Nevertheless, the polygon mirror 6 shown in FIGS. 17–19 has a rotation axis which faces slightly upward toward the surface on which the product is slid. The rotation axis preferably faces upward at an angle of approximately 5°. Therefore, the scanning light generated by the polygon mirror 6 is emitted toward the side of the bottom part 1, in contrast to the device shown in FIGS. 1–3.

In accordance with the second embodiment of the present invention, the light source unit 5 of the device is disposed on the left side facing the side window 14 on top of the body of the side part 4. The light source 5 in accordance with the second embodiment of the invention emits laser light toward the bottom of the device.

In accordance with the second embodiment of the present invention, a small mirror 16 (FIG. 18) is placed below the polygon mirror 6 so that the laser light emitted from the light source 5 is incident to the polygon mirror 6. The small mirror 16 makes it possible for the laser light to be incident directly from the bottom toward the polygon mirror 6.

The reflective light from the bar code is converged by a Fresnel lens 17 and is directed to a light detector 8 by a mirror 18 which is placed on the bottom of the side part 4. The main PCB 10 on which the light detector 8 is mounted is disposed on the bottom of the device. The surface which receives light for light detection faces the left-hand side of FIGS. 17–19.

In contrast to the device shown in FIGS. 1–3, the light detector 8 in accordance with the second embodiment of the invention is placed on the bottom of the device so that the thickness of the device at the position corresponding to the bottom of the side part 4 at the bottom part 1 is somewhat greater than the thickness of the other end (right hand side in FIG. 17) of the bottom part 1. However, since the portion having somewhat greater thickness is located at somewhat of a distance from the operator, enough space is provided for the operator's knees. Moreover, as can be seen by contrasting FIG. 1 and FIG. 17, in accordance with the second embodiment of the invention, the light source 5 is provided in the upper part of the side part 4, and not in the lower left hand side of the side part 4, as in FIG. 1. Further, in accordance with the second embodiment of the invention, as shown in FIG. 17, the space in the upper and lower parts of the bottom part 1 provided with the main PCB 10 in FIG. 17 is wider than the same space in the device shown in FIG. 1. The wider space in this area is advantageous in that the area of the pattern mirror (BMR2, BML2 and the like) located at this position can be made larger, and the light reflected from the bar code can be converged even more than by using the device shown in FIG. 1.

A description of the path of the scanning light in accordance with the second embodiment of the present invention will now be provided below.

The laser light which is emitted downward from the light source 5 is reflected upward by the small mirror 16 placed between the polygon mirror 6 and the Fresnel lens 17 and is incident on the polygon mirror 6. The laser light is then scanned by the polygon mirror 6 and scanning light is generated.

The scanning light generated from the polygon mirror 6 scans the pattern mirror in the following order SVL1-SHR1-BMR1-BVR1-BZ1-BVL1-BML1-SHL1-SVR1. The notation for the pattern mirror in accordance with the second embodiment is the same as was used in accordance with the first embodiment of the present invention.

As can be seen from the above, the scanning light generated by the polygon mirror 6 in accordance with the second embodiment of the invention scans a total of nine pattern mirrors.

The bottom pattern mirror which generates the bottom pattern is made up of the following BMR1, BML1, BMR2, BML2, BMR3, BML3, BMR4, BML4, BZ1, BZ2, BHR, BHL.

The main difference between the second embodiment and the first embodiment is in the number of pattern mirrors which are placed on the bottom of the bottom part 1. In accordance with the first embodiment, four pattern mirrors-BZR3-BZL3-BMR4-BML4-are used on the bottom of the bottom part 1. In accordance with the second embodiment, however, only two pattern mirrors-BMR4 and BML4-are used on the bottom of the bottom part 1. Therefore, in accordance with the second embodiment of the present invention, the area of the pattern mirror placed on the bottom of the bottom part 1 can be proportionately widened.

Each of the scanning patterns which make up the bottom pattern emitted from the bottom window 3 passes through the following paths.

BMR: polygon-BMR1-BMR2-BMR3-BMR4-bottom window

BML: polygon-BML1-BML2-BML3-BMM-bottom window

BCL: polygon-BZ1-BZ2-BML4-bottom window

BCR: polygon-BZ1-BZ2-BMR4-bottom window

BOL: polygon-BZ1-BHR-BMLA-bottom window

BOR: polygon-BZ1-BHL-BMR4-bottom window

BVR: polygon-BVR1-BHL-BMR4-polygon

BVL: polygon-BVL1-BHR-BML4-polygon

As can be seen from the above, all of the scanning patterns use either the BMR4 or the BML4 pattern mirror in common. The BCL (BCR) and BOL (BOR) scanning patterns also use the BZ1 pattern mirror in common. Likewise, the scanning patterns BOL (BOR) and BVL (BVR) use the pattern mirrors BHR (BHL) in common.

The side pattern mirror which generates side patterns is made up of the following mirrors SVR1, SVL1, SVR2, SVL2, SVR3, SVL3, SHR1, SHL1, SHTR2, SHTL2, SHTR3, SHTL3, SHDR2, SHDL2, SHDR3, SHDL3, SHD4.

The device in accordance with the second embodiment of the invention is particularly characteristic in that a single pattern mirror SHD4 is placed at the back of the body of the side part 4.

Each of the scanning patterns which make up the side pattern is emitted from the side window 14 passing through the following paths.

SVR: polygon-SVR1-SVR2-SVR3-side window

SVL: polygon-SVL1-SVL2-SVL3-side window

SHTR: polygon-SHR1-SHTR2-SHTR3-side window

SHTL: polygon-SHL1-SHTL2-SHTL3-side window

SHDR: polygon-SHR1-SHDR2-SHDR3-SHD4-side window

SHDL: polygon-SHL1-SHDL2-SHDL3-SHD4-side window

In accordance with the second embodiment of the present invention, the paths SHTR (SHTL) and SHDR (SHDL) use SHRI (SHL1) in common.

In a manner similar to the first embodiment of the present invention, 360° reading can be performed even if the bar code is vertical or horizontal to the bottom window 3.

Figure 20A:
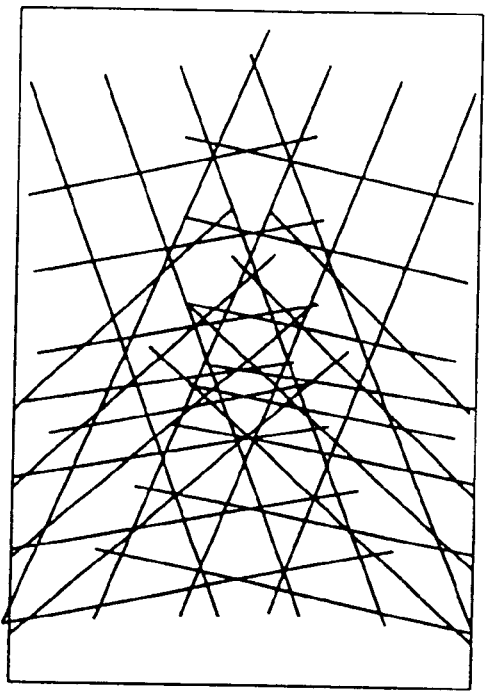
FIG. 20A is a diagram of a bottom pattern emitted from the bar code reader in accordance with the second embodiment of the present invention.
Figure 20B:
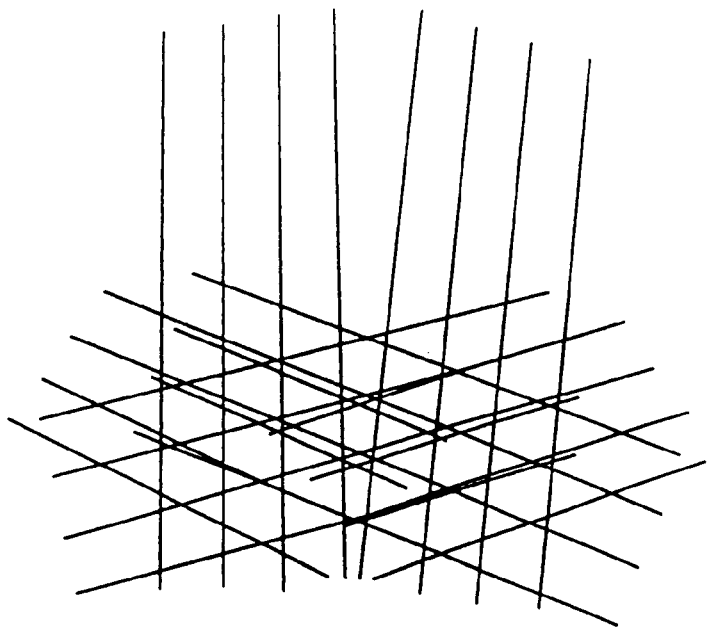
FIG. 20B is a diagram of a side pattern emitted from the bar code reader in accordance with the second embodiment of the present invention.
Figure 21:
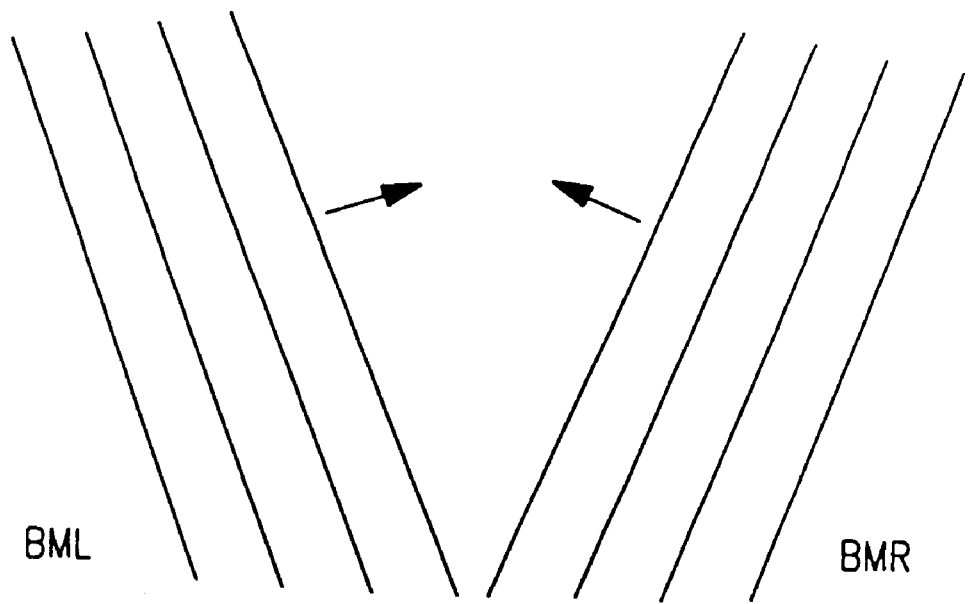
FIG. 21 is a split view of scanning patterns BMR, BML, BVR and BVL which make up the bottom pattern emitted from the bar code reader in accordance with the second embodiment of the present invention.
Figure 21:
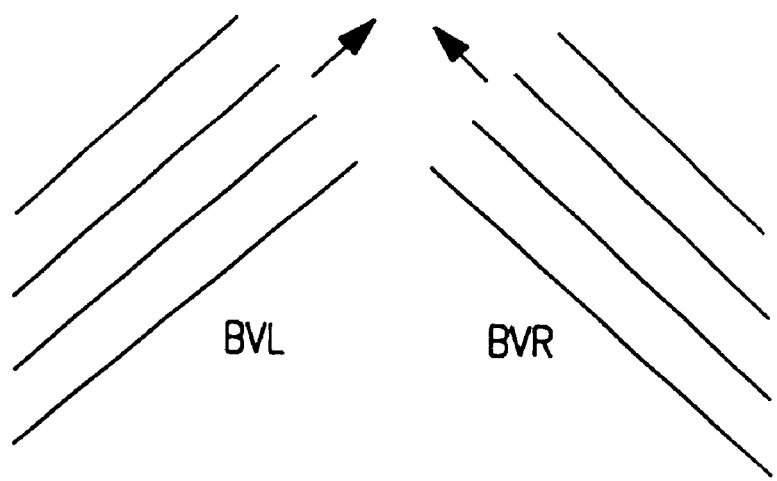
Figure 22:
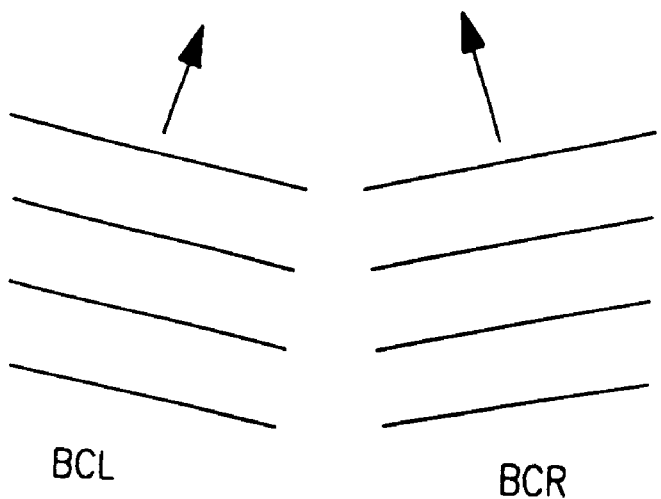
FIG. 22 is a split view of scanning patterns BCR, BCL, BOR and BOL which make up the bottom pattern emitted from the bar code reader in accordance with the second embodiment of the present invention.
Figure 22:
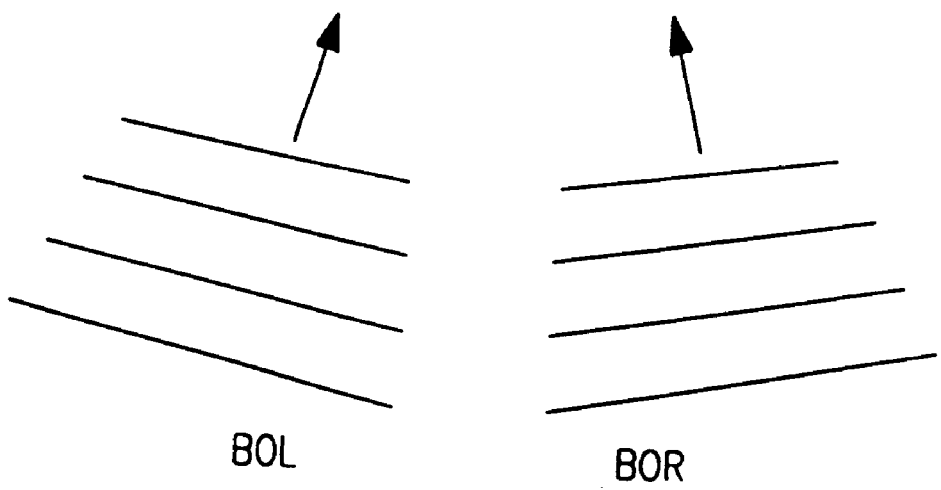
Figure 23:
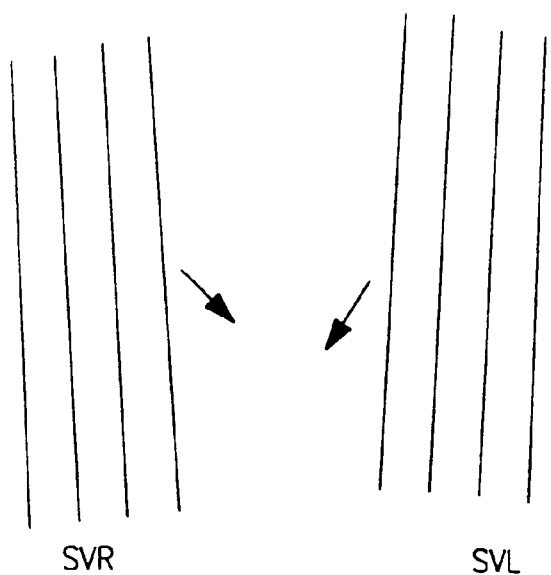
FIG. 23 is a split view of scanning patterns SVL and SVR which make up the side pattern emitted from the bar code reader in accordance with the second embodiment of the present invention.
Figure 24:
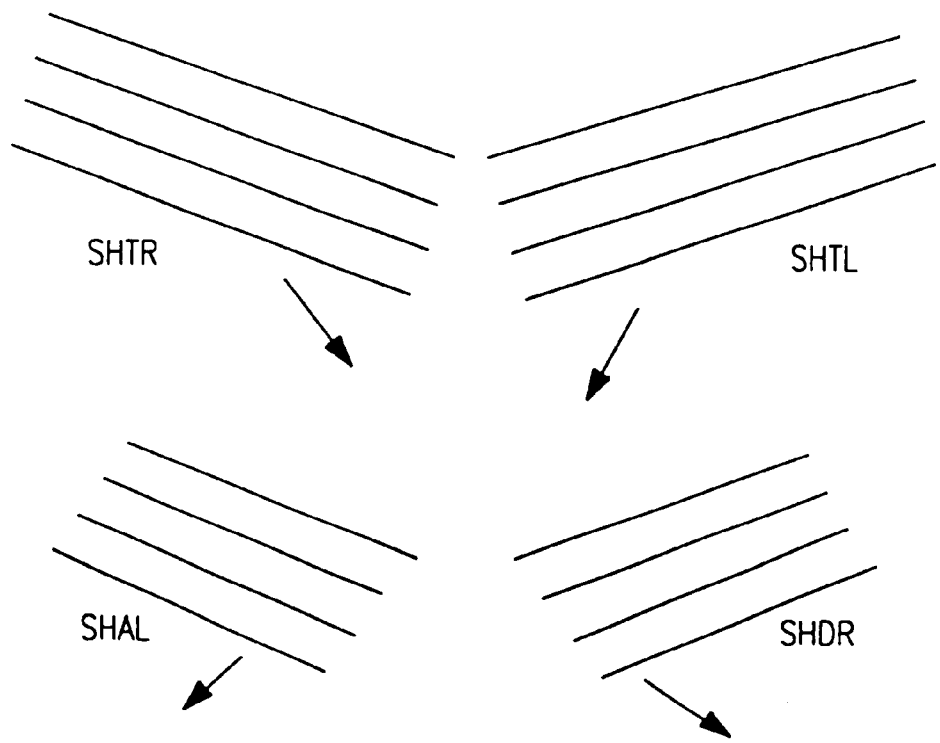
FIG. 24 is a split view of scanning patterns SHTL, SHTR, SHDR and SHDL which make up the side pattern emitted from the bar code reader in accordance with the second embodiment of the present invention.

FIGS. 20A and 20B are diagrams showing the bottom pattern and side pattern on the bottom window 3 and side window 14 surfaces, respectively, in accordance with the second embodiment of the invention. FIG. 21 and FIG. 22 are diagrams showing the separation of the scanning patterns which make up the bottom pattern in accordance with the second embodiment of the present invention. FIG. 23 and FIG. 24 are diagrams showing the separation of the scanning patterns which make up the side pattern in accordance with the second embodiment of the present invention.

Figure 25:
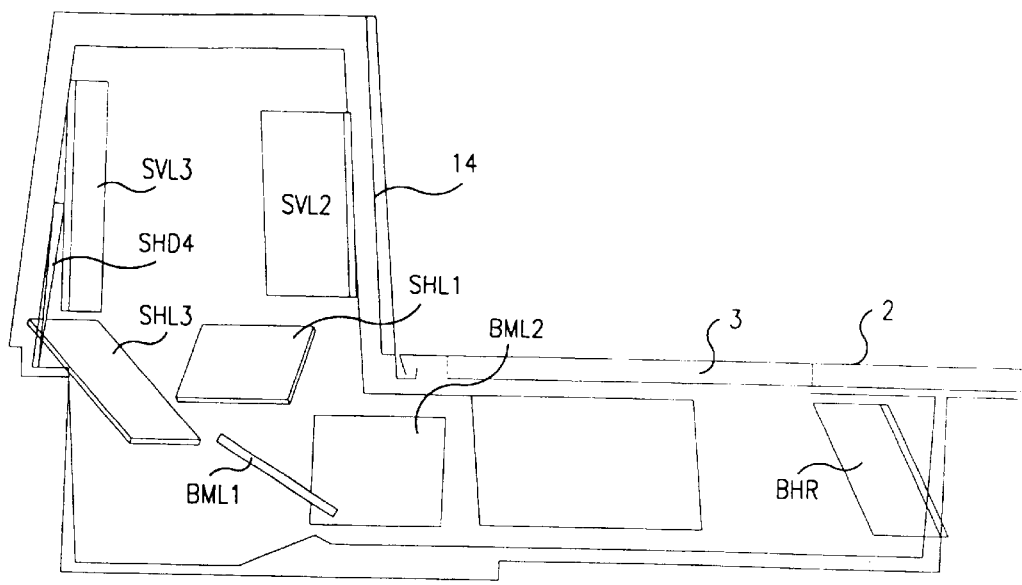
FIG. 25 is an internal side view of the bar code reader showing placement of specific pattern mirrors in accordance with the second embodiment of the present invention.
Figure 26:
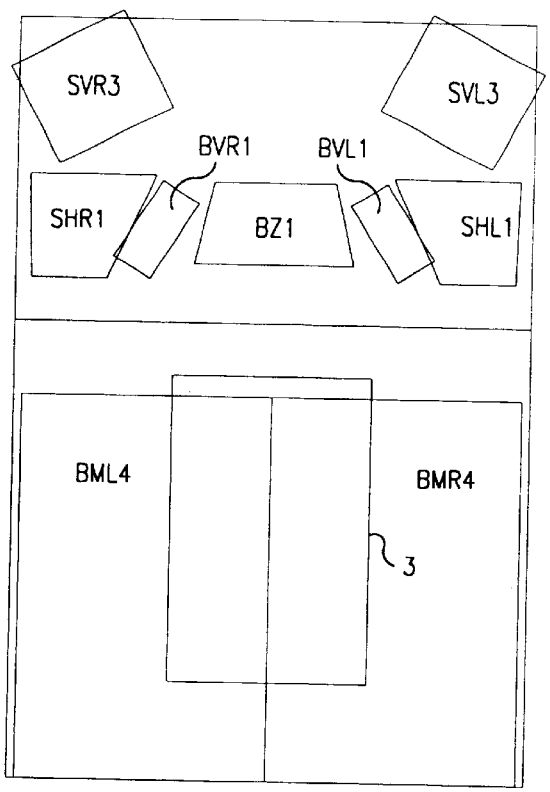
FIG. 26 is an internal upper view of bar code reader showing placement of specific pattern mirrors in accordance with the second embodiment of the present invention.

FIG. 25 is an internal side view of the bar code reader in accordance with the second embodiment of the present invention. The pattern mirror which is placed on the bottommost surface is indicated so that the manner in which it is disposed can be readily understood. Likewise, FIG. 26 is an internal upper view of the bar code reader in accordance with the second embodiment of the invention which shows the manner in which the pattern mirror placed furthest in the rear in the figure is placed.

In accordance with preferred embodiments of the present invention described hereinabove, a single light source 5 provides a single laser beam which is incident on the polygon mirror 6. However, the present invention is not limited to a single laser beam incident on the polygon mirror 6, and it is also completely appropriate to have multiple light sources or to have the laser light generated by a single light source which is split to provide multiple laser beams incident on the polygon mirror 6.

Figure 27:
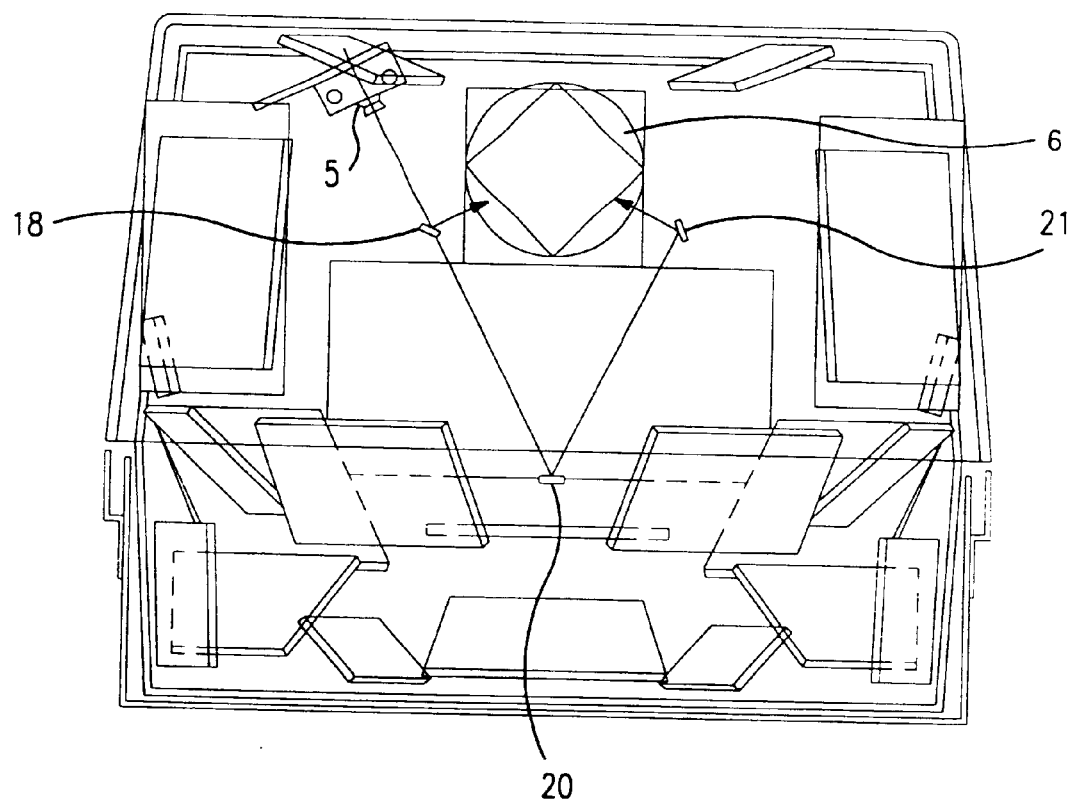
FIG. 27 is a diagram of a bar code reader showing light beams incident from different directions of a polygon mirror in accordance with a third embodiment of the present invention.

FIG. 27 is an internal frontal view of a bar code reader in accordance with a third embodiment of the present invention. The optical scanner in accordance with the third embodiment is similar to the optical scanner described above with respect to the second embodiment and has an additional feature to the device shown in FIG. 17. More specifically, in the device shown in FIG. 27, the light beams emitted from the light source are split using a single light source using a beam splitter midway through. Part of the light which has been split is directly incident on the polygon mirror 6 and other part of the light which has been split is incident on the polygon mirror 6 from the opposite direction via a mirror 20 and a mirror 21.

In accordance with the third embodiment of the invention in which a plurality of laser beams are incident to the polygon mirror 6 from respective different directions, the respective plurality of laser beams are made to correspond respectively to the left and the right of the device. More particularly, some of the laser beams can be made to correspond to the scanning light which is emitted from the right hand side of the device while the rest of the laser beams are made to correspond to the scanning light which is emitted from the left hand side of the device. The device in accordance with the third embodiment of the present invention has a polygon mirror 6 with a large number of reflecting surfaces and is advantageous when the scanning angle for each surface is small.

Further, the device shown in FIGS. 1–3 in accordance with the first embodiment may be modified by setting in place a plurality of light sources and making the laser light incident on the polygon mirror 6 from these light sources respectively. In accordance with this modification, one method of placing the light source involves placing two light sources so that they are symmetrical on the left and right to the centerline of the bar code reader. These light sources respectively emit laser light upwards. Thus, a variety of improvements may be made in the device.

In accordance with the modification to the first embodiment, the laser light from different directions is incident on the polygon mirror 6. However, the light reflected from the bar code is incident on the device as it skirts the light shaft of the scanning light which itself scans the respective bar codes. As a result, multiple devices (concave mirrors) which converge the light reflected from the bar code must be set in place on the optical path of the laser light emitted from the respective light sources. Accordingly, as many light detectors as there are light sources are set in place.

Although it is difficult to reduce the number of parts used for the embodiment of the invention having a plurality of light sources, configurations in which (1) the light source emits light beams vertically to the light source and in which (2) the scanning device is placed near the top end of the body of the side part 4 can both be used so that the effect of making the body of the bottom part 1 thinner can be used to its fullest advantage.

Moreover, in accordance with embodiments of the present invention, to lengthen the scanning line, the length of the optical path may be made as long as possible. More specifically, the number of pattern mirrors which reflect the scanned light can be increased over the prior art device.

In accordance with the first embodiment of the present invention, the scanning patterns other than SVR and SVL are reflected by a minimum of three pattern mirrors. The BMR and BML patterns in particular are first reflected by four pattern mirrors and are then emitted from the bottom window 3.

In accordance with the second embodiment of the present invention, all of the scanning patterns are first reflected by three or more pattern mirrors and then emitted from a respective window. The four scanning patterns BMR, BML, SHDR and SHDL, in particular, are first reflected by all four pattern mirrors and are then emitted from the corresponding windows.

In contrast, the prior art bar code readers do not contemplate using three or more pattern mirrors to reflect light of the scanning pattern, to generate scanning lines and to ensure the length of the optical path in the manner of the present invention. Further, the prior art does not contemplate a device in which scanning lines are emitted via four or more pattern mirrors.

The following advantageous effects can be obtained in accordance with the embodiments of the present invention described above.

First, in accordance with embodiments of the present invention, the polygon mirror and other scanning means are arranged and constructed so that the rotation axis is nearly parallel to the surface of the product which slides along and are accommodated inside the body of the side part. This arrangement and construction of the polygon mirror and other scanning devices makes it possible to ensure a space inside the bottom part and to increase the degree of freedom to which the pattern mirrors can be placed. At the same time, the area of the pattern mirror is widened and the converging efficiency of the reflected light from the bar code can be increased. In particular, the scanning device is set on the top of the body of the side part so that a space can be left at the position where the side part and the bottom part intersect, and the degree of freedom with which the optical parts can be placed can be increased.

In accordance with embodiments of the present invention, the light source is arranged in the side part and light beams are emitted vertically to the surface of the product which is slid. With this type of configuration, it is no longer necessary to maintain a space to guide the light beams emitted from the light source inside the bottom part to the scanning device.

Therefore, the degree of freedom to which the optical parts can be disposed is increased, and at the same time the surface area of the pattern mirror can be increased.

In accordance with embodiments of the present invention, a light detector which receives light from the bar code is placed inside the body of the side part and the light-receiving surface is pointed downward. A substrate on which the light detector is mounted is placed so that it is nearly parallel to the rear surface of the body of the side part. With this type of configuration, it is no longer necessary to place a light detector on the bottom part, and a space can be maintained inside the body of the side part.

In accordance with the embodiments of the present invention described herein, the thickness of the bottom part can be reduced. Moreover, in accordance with embodiments of the invention, a thickness of 90 mm can be realized, which is impossible with the prior art multihead scanner.

In accordance with embodiments of the present invention, after the scanning line is reflected from three or more pattern mirrors, a scanning pattern is emitted. With this configuration, the optical path from the light source to the reading position can be lengthened without increasing the size of the device itself. This is extremely effective and advantageous in generating scanning lines with the required scanning line length when the scanning angle is small.

In accordance with embodiments of the present invention, two or more pattern mirrors can be used commonly with different scanning patterns, thus avoiding placing a unique pattern mirror for each respective scanning pattern which results in making the device ever larger. Further, if a unique pattern mirror is used for each respective scanning pattern and if the device is not made larger, it will be subject to the limitations of pattern mirror placement, and it will no longer be possible to obtain the desired scanning pattern. However, in accordance with embodiments of the present invention, two or more pattern mirrors are used in common with different scanning patterns so that the number of pattern mirrors is reduced. As a result, the limitations on placement of the pattern mirror inside the body are reduced as compared to the prior art device and the effective surface of the pattern mirror can be increased.

In accordance with embodiments of the present invention, scanning patterns which delineate scanning loci in different directions are reflected by a common pattern mirror and then generated, just like a scanning pattern which delineates a scanning locus vertically and a scanning locus horizontally. By using two or more pattern mirrors in common, the scanning direction of the mutual scanning patterns can be made to virtually coincide. Thus, in accordance with embodiments of the present invention, 360° reading can be realized in a multi-head scanner regardless of the orientation of the bar code.

In accordance with embodiments of the present invention, by emitting scanning patterns which delineate different scanning patterns from the same direction, a bar code can be read regardless of the angle and the orientation of the bar code vis-a-vis the surface of the counter and the bar code reading performance can be upgraded even if a multi-head scanner is not used.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical scanner which emits a first scanning pattern upward from a horizontal plane surface and emits a second scanning pattern to a side from a plane surface which is vertical relative to the horizontal plane surface, the optical scanner comprising:

a light source to emit a light beam;

a scanning device to scan the light beam emitted from said light source, the scanning device including a rotation axis; and a drive device to drive the scanning device, wherein the scanning device is positioned in the vertical plane surface so that the rotation axis of the scanning device is approximately horizontal relative to the horizontal plane surface, reducing an overall size of the optical scanner.

2. An optical scanner as recited in claim 1, wherein the light source is positioned so that the light beam is emitted in a direction which is nearly vertical relative to the horizontal plane.

3. A code reader, comprising:

a bottom part embedded in a surface of a counter and emitting a first scanning pattern to read a code optically;

a side part, positioned vertically to the bottom part, and emitting a second scanning pattern different from the first scanning pattern to read the code optically; and a speaker positioned facing a user at a top center of the side part to emit a sound indicating to the user that the code has been read, reducing an overall size of the code reader.

4. A code reader, comprising:

a bottom part embedded in a surface of a counter surface to emit a first scanning pattern to optically read a code;

a side part, positioned vertically to the bottom part, to emit a second scanning pattern different from the first scanning pattern to optically read the code; and a light receiving device mounted on a substrate to receive light reflected from the code, wherein the substrate is positioned in a direction skirting the orientation of a back wall surface of the side part to reduce an overall size of the code reader.

5. A code reader as recited in claim 4, wherein the light receiving device further comprises a light receiving surface facing downward.

6. An optical scanner, comprising:

a light source to emit a light beam;

a scanning device to scan the light beam emitted from the light source;

a scanning pattern mirror to reflect scanned light generated by the scanning device, the scanning pattern mirror including a plurality of mirrors to generate scanning beams which make up the scanning patterns; and an opening from which the scanning beams are emitted, after being reflected by four mirrors of the plurality of scanning pattern mirrors, wherein the light source and the scanning device are located in a side part of the optical scanner to reduce an overall size of the optical scanner.

7. An optical scanner as recited in claim 6, wherein the scanning device is a polygon mirror having four reflecting surfaces.

8. An optical scanner, comprising:

a light source to emit light beams;

a scanning device to scan light beams emitted from the light source;

a scanning pattern mirror to reflect scanned light generated by the scanning device, the scanning pattern mirror including a plurality of mirrors to generate scanning patterns comprising scanning beams; and an opening from which the scanning beams are emitted, wherein a first incident scanning light is scanned in a first direction on at least one of the plurality of mirrors which make up the scanning pattern mirror and a second incident scanning light is scanned in a second direction intersecting the direction of the first scanning light on the at least one of the plurality of mirrors which make up the scanning pattern mirror, and the light source and the scanning device are located in a side part of the optical scanner to reduce an overall size of the optical scanner.

9. An optical scanner, comprising:

a light source to emit light beams;

a scanning device to scan the light beams emitted from the light source;

a pattern mirror including a plurality of mirrors to reflect scanning light generated by the scanning device; and an opening through which the scanning light reflected by the pattern mirror is passed, wherein a first scanning light is scanned on a first virtual surface outside the opening, and a second scanning light is scanned in a direction nearly forming a right angle with the first direction on the virtual surface, and both the first and second scanning lights are emitted from the opening after being respectively reflected by at least three mirrors of the plurality of mirrors which make up the pattern mirror, the at least three mirrors that reflect the first scanning light including at least two mirrors in common with the at least three mirrors that reflect the second scanning light.

10. A bar code reader located on top of a counter, comprising:

a bottom part body having a first surface which is horizontal to a surface of the counter;

a side part body having a second surface positioned at approximately a right angle to the first surface, wherein a thickness of the bottom part body which is positioned underneath the counter is 90 mm or less;

a light source to emit light; and a scanning device to scan the light emitted from the light source, wherein the light source and the scanning device are located entirely inside the side part body to reduce an overall size of the bar code reader.

11. A bar code reader located on top of a counter, comprising:

a bottom part body having a first surface which is horizontal to a surface of the counter;

a side part body having a second surface positioned at approximately a right angle to the first surface;

a light source to emit light;

a scanning device to scan the light emitted from the light source, wherein the light source and the scanning device are located entirely inside the side part body to reduce an overall size of the bar code reader.

12. A bar code reader as recited in claim 11, wherein the side part body further comprises:

a light receiving device to receive light reflected from the bar code; and a light converging device to converge light reflected from the bar code to the light receiving device inside the side part body.

13. A bar code reader as recited in claim 11, wherein the scanning device is located at a position which is higher than the surface of the counter on which the bar code reader is placed.

14. A bar code reader as recited in claim 13, wherein the light source emits light vertically to the surface of the counter.

15. An optical scanner which emits a first scanning pattern upward from a horizontal plane and a second scanning pattern sideways vertical to the horizontal plane, comprising:

a light source to emit a light beam;

a scanning device having a reflecting surface to reflect light beams emitted from the light source; and a drive device to drive the scanning device, wherein the light source and the scanning device are positioned in a side part of the scanner to reduce an overall size of the optical scanner, and the light beam is emitted from the light source nearly vertically upwards and the scanning device is positioned so that light beams are reflected downward.

16. An optical scanner, comprising:

a bottom part which is embedded in the surface of a counter;

a side part positioned vertically to the bottom part;

a light source to emit a light beam; and a scanning device having a reflective surface to directly receive the light beam and to reflect the light beam emitted by the light source, wherein the light source and scanning device are used to generate different scanning patterns being emitted from the side part to reduce an overall size of the optical scanner.

17. An optical scanner as recited in claim 16, further comprising a scanning device having a reflective surface, wherein the reflective surface of the scanning device reflects the light beams downward.

18. A code reader which reads code after emitting scanning light and detecting the light reflected from objects, comprising:

a first scanning light which is scanned in a first direction;

a second scanning light which is scanned in a direction intersecting with the first scanning light, both scanning lights passing through the same optical path;

a light source to emit light; and a scanning device to scan the light emitted from the light source, wherein the light source and the scanning device are located entirely inside the side part body to reduce an overall size of the bar code reader.

19. An optical scanner, comprising:

a bottom part emitting a first scanning pattern upward from a horizontal plane surface to read a code optically; and a side part, positioned approximately vertically to the bottom part, to emit a second scanning pattern different from the first scanning pattern to read the code optically, the side part including a light source to emit a light beam, and a scanning device to scan the light beam emitted from the light source, wherein the light beam emitted by the light source is used to generate both the first scanning pattern and the second scanning pattern.

20. An optical scanner as recited in claim 19, wherein the scanning device is a polygon mirror having reflective surfaces with different slopes directed downward, and the scanning device reflects the light beams from the light source downward.

21. An optical scanner as recited in claim 19, wherein the side part further comprises a scanning pattern mirror to reflect scanned light generated by the scanning device, the scanning pattern mirror includes a plurality of pattern mirrors to generate a plurality of scanning patterns, and wherein at least two scanning patterns with different scanning loci are reflected from at least one common pattern mirror.

22. An optical scanner as recited in claim 19, wherein the bottom part further comprises a scanning pattern mirror to reflect scanned light generated by the scanning device, the scanning pattern mirror includes a plurality of pattern mirrors to generate a plurality of scanning patterns, and wherein at least two scanning patterns with different scanning loci are reflected from at least one common pattern mirror.

* * * * *